United States Patent
Scipio et al.

(10) Patent No.: US 11,859,533 B2
(45) Date of Patent: Jan. 2, 2024

(54) SYSTEMS AND METHODS FOR ADDITION OF FUEL ADDITIVES TO CONTROL TURBINE CORROSION

(71) Applicant: General Electric Company, Schenectady, NY (US)

(72) Inventors: Alston Ilford Scipio, Mableton, GA (US); Sanji Ekanayake, Mableton, GA (US)

(73) Assignee: General Electric Company, Schenectady, NY (US)

( * ) Notice: Subject to any disclaimer, the term of this patent is extended or adjusted under 35 U.S.C. 154(b) by 143 days.

(21) Appl. No.: 17/338,014

(22) Filed: Jun. 3, 2021

(65) Prior Publication Data

US 2022/0389863 A1 Dec. 8, 2022

(51) Int. Cl.
  *F23R 3/34* (2006.01)
  *F02C 3/22* (2006.01)
  (Continued)

(52) U.S. Cl.
  CPC ............... *F02C 3/22* (2013.01); *B08B 3/003* (2013.01); *B08B 3/02* (2013.01); *B08B 3/08* (2013.01); *B08B 9/0325* (2013.01); *C11D 3/046* (2013.01); *C11D 11/0041* (2013.01); *C11D 17/0043* (2013.01); *F01D 25/002* (2013.01);
  (Continued)

(58) Field of Classification Search
  CPC ........ F01D 25/002; F01D 25/007; F02C 7/30; F02C 7/305; F02C 3/30; F23R 3/34; F23R 3/346; F23R 3/18
  See application file for complete search history.

(56) References Cited

U.S. PATENT DOCUMENTS

| 4,995,915 A | * | 2/1991 | Sewell | F02C 3/30 |
| | | | | 134/22.12 |
| 5,503,683 A | * | 4/1996 | Butcher | F02M 65/008 |
| | | | | 134/22.12 |

(Continued)

FOREIGN PATENT DOCUMENTS

EP 2206963 A2 7/2010

OTHER PUBLICATIONS

European Search Report dated Nov. 3, 2022 for EP Application 22174744.7; p. 9.

*Primary Examiner* — Thuyhang N Nguyen
(74) *Attorney, Agent, or Firm* — James Pemrick; Charlotte Wilson; Hoffman Warnick LLC

(57) ABSTRACT

A gas turbine engine system includes a gas turbine engine including a compressor, combustor including a plurality of late lean fuel injectors supplied with secondary fuel; gas turbine, and wash system configured to be attached and in fluid communication with the late lean fuel injectors. The wash system includes a water source including water; first fluid source including a first fluid providing vanadium ash and vanadium deposit mitigation and removal from internal gas turbine components; a mixing chamber in communication with the water source and first fluid source; a water pump to pump the water to the mixing chamber; a first fluid pump the first fluid to the mixing chamber; a fluid line in fluid communication with the mixing chamber and late lean fuel injectors so fluid from the mixing chamber is injected into the combustor at the late lean fuel injectors while the gas turbine engine is on-line.

18 Claims, 9 Drawing Sheets

(51) Int. Cl.

| | | |
|---|---|---|
| *B08B 3/00* | (2006.01) | |
| *B08B 3/02* | (2006.01) | |
| *B08B 3/08* | (2006.01) | |
| *B08B 9/032* | (2006.01) | |
| *C11D 3/04* | (2006.01) | |
| *C11D 11/00* | (2006.01) | |
| *C11D 17/00* | (2006.01) | |
| *F01D 25/00* | (2006.01) | |
| *F23D 14/50* | (2006.01) | |
| *F23R 3/36* | (2006.01) | |
| *F02C 7/30* | (2006.01) | |
| *F23K 5/00* | (2006.01) | |
| *F23D 11/38* | (2006.01) | |
| *F23D 14/64* | (2006.01) | |
| *F02C 7/228* | (2006.01) | |

(52) U.S. Cl.
CPC ............... *F02C 7/30* (2013.01); *F23D 14/50* (2013.01); *F23R 3/346* (2013.01); *F23R 3/36* (2013.01); *B08B 2203/027* (2013.01); *B08B 2209/032* (2013.01); *F02C 7/228* (2013.01); *F05D 2220/32* (2013.01); *F05D 2230/72* (2013.01); *F23D 11/386* (2013.01); *F23D 14/64* (2013.01); *F23K 5/00* (2013.01)

(56) References Cited

U.S. PATENT DOCUMENTS

| | | | |
|---|---|---|---|
| 9,739,168 | B2 | 8/2017 | Ekanayake et al. |
| 9,759,131 | B2 | 9/2017 | Scipio et al. |
| 9,874,143 | B2 | 1/2018 | Klosinski et al. |
| 9,976,488 | B2 | 5/2018 | Sokolov et al. |
| 10,272,475 | B2 | 4/2019 | Scipio et al. |
| 2004/0026261 | A1 | 2/2004 | Stoffer et al. |
| 2012/0251742 | A1 | 10/2012 | Kerber |
| 2015/0159556 | A1* | 6/2015 | Scipio ............... F01D 25/002 60/801 |
| 2015/0159559 | A1 | 6/2015 | Scipio et al. |
| 2015/0354462 | A1 | 12/2015 | Ekanayake et al. |
| 2017/0158978 | A1* | 6/2017 | Montagne ............ C10L 1/1233 |
| 2018/0058317 | A1* | 3/2018 | Shaffer ................ F01D 25/002 |
| 2020/0040763 | A1* | 2/2020 | Wang ...................... B08B 9/00 |

\* cited by examiner

SYSTEMS AND METHODS FOR ADDITION OF FUEL ADDITIVES TO CONTROL TURBINE CORROSION

TECHNICAL FIELD

The present disclosure relates generally to gas turbine engines, and more particularly, relates to wash systems and related methods for cleaning of internal components of a gas turbine engine.

BACKGROUND

As a gas turbine engine system operates, airborne contaminants that are not captured by the inlet air filtration system may accumulate naturally or form complex compounds with combustion byproducts and bond to various internal metallic components of the engine, such as the blades and the vanes of internal components. These internal metallic components may include but are not limited to the gas turbine and the compressor. Although the gas turbine engine system may include an inlet air filtration system, a certain degree of contaminant accumulation may be unavoidable and may depend on various environmental conditions at the site of operation. Common contaminants may include small amounts of dust and debris that pass through the inlet air filtration system as well as un-filterable hydrocarbon-based materials such as smoke, soot, grease, oil film, and organic vapors. Accumulated contaminants on, for example, the blades and vanes may restrict airflow through the compressor and may shift the airfoil pattern. In this manner, such accumulation may compromise cooling passages and adversely affect the performance and efficiency of the compressor or turbine section and thus the overall performance and efficiency of the gas turbine engine system. Such effects may decrease power output, increase fuel consumption, and/or increase operating costs.

To reduce contaminant accumulation, the gas turbine engine operating and maintenance regime may include the utilization of a water wash procedure for removing contaminating particles from, for example, the compressor blades and vanes. An on-line water wash protocol may be used to remove contaminant particles from compressor blades and vanes via a flow of water, such as demineralized water, while the gas turbine engine system is operating at full speed and at a predetermined load. The on-line water wash protocol may deliver water upstream of the compressor via an installed manifold including nozzles positioned about a bellmouth of the compressor. The nozzles may create a spray mist of water droplets in this region of relatively low velocity air, and the negative pressure produced by the operating compressor may draw the spray mist into contact with the compressor blades and vanes for contaminant removal.

An off-line water wash protocol may be used in a similar manner to remove contaminating particles via a sequential flow of water and detergent while the gas turbine engine system is shut down or operating at a turning gear speed and is not loaded. Known off-line water wash systems may sequentially deliver the flow of water and detergent upstream of the compressor via an off-line manifold including nozzles positioned about a bellmouth of the compressor. In certain applications, a water wash system may be configured to operate in either an on-line mode or an off-line mode. In this manner, on-line washes may be carried out periodically to increase performance and efficiency of the gas turbine engine system when the operating schedule does not permit shutdown time to perform a more effective off-line wash. The frequency and duration of on-line and off-line washes may vary depending on the degree of contaminant accumulation and environmental conditions at the site of operation.

Although conventional water wash systems and methods may be effective in removing contaminants from the blades and vanes of early compressor stages, such systems and methods often are less effective in removing contaminants from the higher numbered stages of blades and vanes of the gas turbine because the flow of water and detergent (if any) injected about the bellmouth of the compressor sometimes has limited reach. Gas turbine hot gas path components, including but not limited to, gas turbine blades and nozzles, shrouds may still have some contamination. Moreover, following a wash with such systems and methods, residual amounts of the water and detergent may remain on the blades and vanes. Remaining water and/or detergent may adversely affect subsequent restart and operation of the gas turbine engine system. Depending on the idle time after wash, the residual amounts of water and detergent also may facilitate surface rusting, corrosion, or subsequent accumulation of contaminants on the compressor blades and vanes and/or gas turbine blades and vanes, and on uncoated combustion components along the hot gas flow path. Further, the performance gain provided by conventional water wash systems and methods may be of limited duration, necessitating frequent washes carried out with the water wash systems to maintain adequate performance, which ultimately may increase total operating costs of the gas turbine engine system.

BRIEF DESCRIPTION

All aspects, examples and features mentioned below can be combined in any technically possible way.

An aspect of the disclosure provides a system that includes a gas turbine engine, the gas turbine engine including a compressor, a combustor, a gas turbine, the combustor including a plurality of late lean fuel injectors supplied with secondary fuel to an interior of the combustor; and a wash system configured to be attached to and in fluid communication with the a plurality of late lean fuel injectors of the combustor. The wash system includes a water source supplying water; a first fluid source supplying a first fluid; a mixing chamber in communication with the water source and the first fluid source; a water pump configured to pump the water to the mixing chamber; a first fluid pump configured to pump the first fluid to the mixing chamber; a fluid line configured to be in fluid communication with the mixing chamber and at least one of the plurality of late lean fuel injectors such that a fluid from the mixing chamber including the water, the first fluid, or a mixture thereof is injected into the combustor at at least one of the plurality of late lean fuel injectors. The wash system is operated with the gas turbine engine in an off-line mode.

Another aspect of the disclosure includes any of the preceding aspects, and wherein the first fluid source includes a detergent source, and wherein the first fluid includes a detergent.

Another aspect of the disclosure includes any of the preceding aspects, and wherein the first fluid source includes an anti-static solution source, and wherein the first fluid includes an anti-static solution.

Another aspect of the disclosure includes any of the preceding aspects, and wherein the first fluid source includes a mixture of demineralized/deionized water and at least one of magnesium (Mg), yttrium (Y), or detergent.

Another aspect of the disclosure includes any of the preceding aspects, and wherein the mixture of demineralized/deionized water and magnesium (Mg) Mg), yttrium (Y), or detergent removes vanadium from internal components of the gas turbine engine.

Another aspect of the disclosure includes any of the preceding aspects, and wherein the mixture of demineralized/deionized water and magnesium (Mg), yttrium (Y), or detergent is provided as a solution or as a foam.

Another aspect of the disclosure includes any of the preceding aspects, and wherein the mixing chamber includes one or more angled counter flow nozzles therein, the one or more angled counter flow nozzles extending into the mixing chamber at an angle with respect to a central axis of the mixing chamber and configured to inject the first fluid at the angle in a direction counter to a flow of the water in the mixing chamber.

Another aspect of the disclosure includes any of the preceding aspects, and wherein the water source is in communication with the mixing chamber via a water source line and water pump.

Another aspect of the disclosure includes any of the preceding aspects, and wherein the first fluid source is in communication with the mixing chamber via a first fluid source line and first fluid pump.

Another aspect of the disclosure includes any of the preceding aspects, and, further including a controller, the controller being in operative communication with the water pump and the first fluid pump, wherein the controller is configured to regulate a flow of the water and the first fluid through the fluid line to a plurality of late lean fuel injectors.

Another aspect of the disclosure includes any of the preceding aspects, and wherein the controller further includes at least one flow control valve positioned in fluid line, the at least one flow control valve is in communication with the controller for enabling actuation of the at least one flow control valve between at least open and closed positions, the actuation caused by the controller.

Another aspect of the disclosure includes any of the preceding aspects, and wherein the controller further includes at least one flow sensor, positioned in fluid line, the at least one flow sensor in communication with the controller for sensing flow in the fluid line.

An aspect of the disclosure provides a method of washing an off-line gas turbine engine, the gas turbine engine including a compressor, a combustor, a gas turbine, the combustor including a plurality of late lean fuel injectors supplied with secondary fuel to an interior of the combustor. The method includes supplying water from a water source to a mixing chamber of a wash system; supplying a first fluid from a first fluid source to the mixing chamber of the wash system; supplying the water and first fluid to the mixing chamber including pumping water from the water source and pumping the first fluid from the first fluid source; and injecting fluid from the mixing chamber to at least one of the plurality of late lean fuel injectors.

Another aspect of the disclosure includes any of the preceding aspects, and wherein the first fluid source includes a detergent source, and wherein the first fluid includes a detergent.

Another aspect of the disclosure includes any of the preceding aspects, and wherein the first fluid source includes an anti-static solution source, and wherein the first fluid includes an anti-static solution.

Another aspect of the disclosure includes any of the preceding aspects, and wherein the first fluid source includes a mixture of demineralized/deionized water and at least one of magnesium (Mg), yttrium (Y), or detergent.

Another aspect of the disclosure includes any of the preceding aspects, and the method including removing vanadium from internal metallic components of the gas turbine engine by the mixture of demineralized/deionized water and magnesium (Mg), yttrium (Y), or detergent.

Another aspect of the disclosure includes any of the preceding aspects, and the method including providing the mixture of demineralized/deionized water and magnesium (Mg), yttrium (Y), or detergent as a solution or as a foam.

Another aspect of the disclosure includes any of the preceding aspects, and wherein the mixing chamber includes one or more angled counter flow nozzles therein, the one or more angled counter flow nozzles extending into the mixing chamber at an angle with respect to a central axis of the mixing chamber and to inject the first fluid at the angle in a direction counter to a flow of the water in the mixing chamber, and further including mixing the water and the first fluid using the one or more angled counter flow nozzles.

Another aspect of the disclosure includes any of the preceding aspects, and the gas turbine engine further includes a controller, the controller in operative communication with the water pump, the first fluid pump, and the fluid line, and further including regulating a flow of the water and the first fluid through the fluid line to a plurality of late lean fuel injectors.

An aspect of the disclosure provides a gas turbine engine system. The gas turbine engine system includes a gas turbine engine, the gas turbine engine including a compressor, a combustor, a gas turbine, the combustor including a plurality of late lean fuel injectors supplied with secondary fuel to an interior of the combustor; a wash system configured to be attached to and in fluid communication with the a plurality of late lean fuel injectors of the combustor. The wash system includes a water source including water; a first fluid source including a first fluid, the first fluid providing vanadium ash and vanadium deposit mitigation and removal from internal components of the gas turbine; a mixing chamber in communication with the water source and the first fluid source; a water pump configured to pump the water to the mixing chamber; a first fluid pump configured to pump the first fluid to the mixing chamber; a fluid line configured to be in fluid communication with the mixing chamber and at least one of the plurality of late lean fuel injectors such that a fluid from the mixing chamber including the water, the first fluid, or a mixture thereof is injected into the combustor at at least one of the plurality of late lean fuel injectors, wherein the mixture is injected while the gas turbine engine is on-line.

Another aspect of the disclosure includes any of the preceding aspects, and wherein the first fluid source includes a mixture of demineralized/deionized water and at least one of magnesium (Mg), yttrium (Y), or detergent injected into the combustor at at least one of the plurality of late lean fuel injectors, and the mixture of demineralized/deionized water and at least one of magnesium (Mg), yttrium (Y), or detergent as vanadium ash formation mitigant is delivered to the late lean fuel injectors and then conveyed to internal components of gas turbine with a flow of combustion gases from the combustor to the gas turbine.

Another aspect of the disclosure includes any of the preceding aspects, and wherein the mixture of demineralized/deionized water and magnesium (Mg) Mg), yttrium (Y), or detergent removes vanadium from internal metallic components of the gas turbine engine.

Another aspect of the disclosure includes any of the preceding aspects, and wherein the mixture of demineralized/deionized water and magnesium (Mg) Mg), yttrium (Y), or detergent is provided as water-based or as foam.

Another aspect of the disclosure includes any of the preceding aspects, and wherein the mixing chamber includes one or more angled counter flow nozzles therein, the one or more angled counter flow nozzles extending into the mixing chamber at an angle with respect to a central axis of the mixing chamber and configured to inject the first fluid at the angle in a direction counter to a flow of the water in the mixing chamber.

Another aspect of the disclosure includes any of the preceding aspects, and wherein the water source is in communication with the mixing chamber via a water source line and a water pump.

Another aspect of the disclosure includes any of the preceding aspects, and wherein the first fluid source is in communication with the mixing chamber via a first fluid source line and a first fluid pump.

Another aspect of the disclosure includes any of the preceding aspects, and further including an independent microprocessor based controller, the controller being in operative communication with the water pump and the first fluid pump, wherein the controller is configured to regulate a flow of the water and the first fluid through the fluid line to a plurality of late lean fuel injectors.

Another aspect of the disclosure includes any of the preceding aspects, and wherein the controller further includes at least one flow control valve positioned in the fluid line, the at least one flow control valve in communication with the controller for enabling actuation of the at least one flow control valve between at least open and closed positions, the actuation caused by the controller.

Another aspect of the disclosure includes any of the preceding aspects, and wherein the controller further includes at least one flow sensor, positioned in the fluid line, the at least one flow sensor in communication with the controller for sensing flow in the fluid line.

An aspect of the disclosure provides a method of washing an on-line gas turbine engine, the gas turbine engine including a compressor, a combustor, a gas turbine, and the combustor including a plurality of late lean fuel injectors supplied with secondary fuel to an interior of the combustor. The method includes supplying water from a water source to a mixing chamber of a wash system; supplying a first fluid from a first fluid source to the mixing chamber of the wash system, the first fluid providing vanadium ash and vanadium deposit mitigation and removal from internal components of the gas turbine; supplying the water and the first fluid to the mixing chamber including pumping water from the water source and pumping the first fluid from the first fluid source; and injecting fluid from the mixing chamber to at least one of the plurality of late lean fuel injectors while the gas turbine engine is on-line. Another aspect of the disclosure includes any of the preceding aspects, and wherein the first fluid source includes a mixture of demineralized/deionized water and at least one of magnesium (Mg), yttrium (Y), or detergent.

Another aspect of the disclosure includes any of the preceding aspects, and the method includes removing vanadium from internal components of the gas turbine engine using the mixture of demineralized/deionized water and magnesium (Mg) Mg), yttrium (Y), or detergent.

Another aspect of the disclosure includes any of the preceding aspects, and the method including providing the mixture of demineralized/deionized water and magnesium (Mg) Mg), yttrium (Y), or detergent as water-based or as foam.

Another aspect of the disclosure includes any of the preceding aspects, and wherein the mixing chamber includes one or more angled counter flow nozzles therein, the one or more angled counter flow nozzles extending into the mixing chamber at an angle with respect to a central axis of the mixing chamber to inject the first fluid at the angle in a direction counter to a flow of the water in the mixing chamber.

Another aspect of the disclosure includes any of the preceding aspects, and, the gas turbine engine further including a controller, the controller in operative communication with the water pump, the first fluid pump, and the fluid line, and further comprising regulating a flow of the water and the first fluid through the fluid line to a plurality of late lean fuel injectors using the controller.

Another aspect of the disclosure includes any of the preceding aspects, and the method further includes forming a vanadium based ash component magnesium orthovanadate [$3MgO \cdot V_2O_5$] by treating deposited vanadium at an appropriate Mg/V ratio, wherein magnesium orthovanadate does not melt and remains in a solid state on the internal components of the gas turbine during operation of the gas turbine.

Another aspect of the disclosure includes any of the preceding aspects, and the method further includes forming an additional ash component, the additional ash component including water soluble magnesium sulfate ($MgSO_4$), wherein $MgSO_4$ is removed from the gas turbine engine system through water washing.

An aspect of the disclosure provides a gas turbine engine system including a gas turbine engine. The gas turbine engine includes a compressor, a combustor, a gas turbine, the combustor including a plurality of late lean fuel injectors supplied with secondary fuel to an interior of the combustor. The gas turbine engine system also includes a wash system configured to be attached to and in fluid communication with the plurality of late lean fuel injectors of the combustor. The wash system includes a water source supplying water; a water pump configured to pump the water; an anti-corrosion agent fluid source including a supply of an anti-corrosion agent including a polyamine corrosion inhibitor; an anti-corrosion agent supply piping, the anti-corrosion agent supply piping being in fluid communication with the anti-corrosion agent fluid source; a mixing chamber in communication with the water source and the anti-corrosion agent source, the mixing chamber being in fluid communication with the water supply piping and the anti-corrosion agent supply piping, the mixing chamber being configured to receive water from the water supply piping and the anti-corrosion agent from the anti-corrosion agent supply piping to produce an anti-corrosion mixture, the anti-corrosion mixture including a mixture of the anti-corrosion agent and water; a water pump configured to pump the water to the mixing chamber; a first fluid pump configured to pump the anti-corrosion agent to the mixing chamber; a fluid line configured to be in fluid communication with the mixing chamber and at least one of the plurality of late lean fuel injectors such that a fluid from the mixing chamber including the water, the anti-corrosion agent fluid, or a mixture thereof is injected into the combustor at at least one of the plurality of late lean fuel injectors. The mixture is injected while the gas turbine engine is off-line.

Another aspect of the disclosure includes any of the preceding aspects, wherein the polyamine corrosion inhibitor includes an organic compound.

Another aspect of the disclosure includes any of the preceding aspects, wherein the polyamine corrosion inhibitor includes two or more primary amino groups, $NH_2$.

Another aspect of the disclosure includes any of the preceding aspects, wherein the polyamine corrosion inhibitor includes a volatile neutralizing amine, the volatile neutralizing amine configured to neutralize acidic contaminants and elevate pH of the mixture into an alkaline range, wherein the mixture with the volatile neutralizing amine provides protective metal oxide coatings on internal components of the gas turbine.

Another aspect of the disclosure includes any of the preceding aspects, wherein the polyamine corrosion inhibitor includes at least one of cycloheaxylamine, morpholine, monoethanolamine, N-9-Octadecenyl-1,3-propanediamine, 9-octadecen-1-amine, (Z)-1-5, dimethylaminepropylamine (DMPA), diethylaminoethanol (DEAE), and combinations thereof.

Another aspect of the disclosure includes any of the preceding aspects, wherein the polyamine corrosion inhibitor includes an amount of the anti-corrosion agent/inhibitor in the anti-corrosion mixture in a range from about 50 ppm to about 800 ppm.

Another aspect of the disclosure includes any of the preceding aspects, wherein the polyamine corrosion inhibitor includes an amount of the anti-corrosion agent/inhibitor in the anti-corrosion mixture in a range from about 100 ppm to about 500 ppm.

Another aspect of the disclosure includes any of the preceding aspects, wherein the mixing chamber includes one or more angled counter flow nozzles therein, the one or more angled counter flow nozzles extending into the mixing chamber at an angle with respect to a central axis of the mixing chamber and configured to inject the polyamine corrosion inhibitor at the angle in a direction counter to a flow of the water in the mixing chamber.

Another aspect of the disclosure includes any of the preceding aspects, wherein the water source is in communication with the mixing chamber via a water source line and a water pump.

Another aspect of the disclosure includes any of the preceding aspects, wherein the polyamine corrosion inhibitor source is in communication with the mixing chamber via a polyamine corrosion inhibitor line and a polyamine corrosion inhibitor pump.

Another aspect of the disclosure includes any of the preceding aspects, further including a controller, the controller being in operative communication with the water pump and the polyamine corrosion inhibitor pump, wherein the controller is configured to regulate a flow of the mixture of water and the polyamine corrosion inhibitor through the fluid line to a plurality of late lean fuel injectors.

Another aspect of the disclosure includes any of the preceding aspects, wherein the controller further includes at least one flow control valve positioned in fluid line, the at least one flow control valve in communication with the controller for enabling actuation of the at least one flow control valve between at least open and closed positions, the actuation caused by the controller.

Another aspect of the disclosure includes any of the preceding aspects, wherein the controller further includes at least one flow sensor, positioned in the fluid line, the at least one flow sensor in communication with the controller for sensing flow in the fluid line.

An aspect of the disclosure provides a method of washing an off-line gas turbine engine. The gas turbine engine including a compressor, a combustor, a gas turbine, the combustor including a plurality of late lean fuel injectors supplied with secondary fuel to an interior of the combustor. The method includes supplying water from a water source to a mixing chamber of a wash system; supplying an anti-corrosion agent from an anti-corrosion agent fluid source through an anti-corrosion agent supply piping to the mixing chamber, the anti-corrosion agent including a polyamine corrosion inhibitor, the anti-corrosion agent supply piping being in fluid communication with the anti-corrosion agent fluid source; supplying the water and anti-corrosion agent fluid to the mixing chamber including pumping water from the water source and pumping the anti-corrosion agent fluid from the anti-corrosion agent fluid source, the mixing chamber configured to receive water from the water supply piping and the anti-corrosion agent fluid from the anti-corrosion agent supply piping to produce an anti-corrosion mixture, the anti-corrosion mixture including a mixture of the anti-corrosion agent and water; and injecting the anti-corrosion mixture from the mixing chamber to at least one of the plurality of late lean fuel injectors while the gas turbine engine is off-line.

Another aspect of the disclosure includes any of the preceding aspects, wherein the polyamine corrosion inhibitor includes an organic compound.

Another aspect of the disclosure includes any of the preceding aspects, wherein the polyamine corrosion inhibitor includes two or more primary amino groups, $NH_2$.

Another aspect of the disclosure includes any of the preceding aspects, wherein the polyamine corrosion inhibitor includes a volatile neutralizing amine, the volatile neutralizing amine configured to neutralize acidic contaminants and elevate pH of the mixture into an alkaline range, wherein the mixture with the volatile neutralizing amine can provide protective metal oxide coatings on internal components of the gas turbine.

Another aspect of the disclosure includes any of the preceding aspects, wherein the polyamine corrosion inhibitor includes at least one of cycloheaxylamine, morpholine, monoethanolamine, N-9-Octadecenyl-1,3-prop anediamine, 9-octadecen-1-amine, (Z)-1-5, dimethylaminepropylamine (DMPA), diethylaminoethanol (DEAE), and combinations thereof.

Another aspect of the disclosure includes any of the preceding aspects, wherein the mixing chamber includes one or more angled counter flow nozzles therein, the one or more angled counter flow nozzles extending into the mixing chamber at an angle with respect to a central axis of the mixing chamber to inject the first fluid at the angle in a direction counter to a flow of the water in the mixing chamber.

Another aspect of the disclosure includes any of the preceding aspects, the gas turbine engine further including a controller, the controller in operative communication with the water pump and the first fluid pump, wherein the method includes the controller regulating a flow of the water and the anti-corrosion agent fluid through the fluid line to a plurality of late lean fuel injectors.

Two or more aspects described in this disclosure, including those described in this summary section, may be combined to form implementations not specifically described herein.

The details of one or more implementations are set forth in the accompanying drawings and the description below.

Other features, objects and advantages will be apparent from the description and drawings, and from the claims.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

Figure 1:
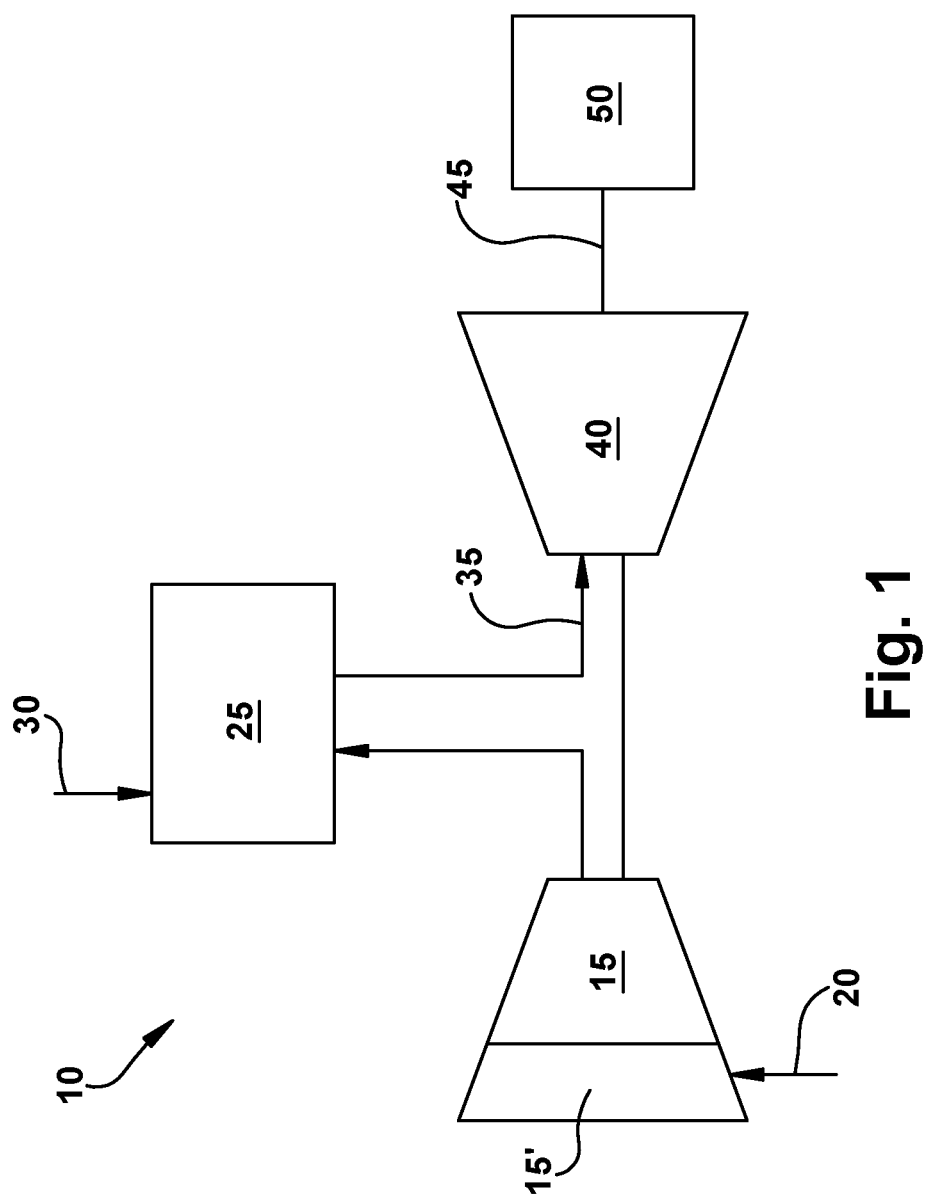
FIG. 1 is a schematic diagram of a gas turbine engine system including a compressor, a combustor, a turbine, and a load, according to embodiments of the disclosure.

It is noted that the drawings of the disclosure are not necessarily to scale. The drawings are intended to depict only typical aspects of the disclosure and therefore should not be considered as limiting the scope of the disclosure. In the drawings, like numbering represents like elements between the drawings.

DETAILED DESCRIPTION

As an initial matter, in order to clearly describe the subject matter of the current disclosure, it will become necessary to select certain terminology when referring to and describing relevant machine components within a turbine system, such as but not limited to a gas turbine engine system. To the extent possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

In addition, several descriptive terms may be used regularly herein, and it should prove helpful to define these terms at the onset of this section. These terms and their definitions, unless stated otherwise, are as follows. As used herein, "downstream" and "upstream" are terms that indicate a direction relative to the flow of a fluid, such as the working fluid through the turbine engine or, for example, the flow of air through the combustor or coolant through one of the turbine's component systems. The term "downstream" corresponds to the direction of flow of the fluid, and the term "upstream" refers to the direction opposite to the flow (i.e., the direction from which the flow originates). The terms "forward" and "aft," without any further specificity, refer to directions, with "forward" referring to the front or compressor end of the engine, and "aft" referring to the rearward section of the turbomachine.

It is often required to describe parts that are disposed at differing radial positions with regard to a center axis. The term "radial" refers to movement or position perpendicular to an axis. For example, if a first component resides closer to the axis than a second component, it will be stated herein that the first component is "radially inward" or "inboard" of the second component. If, on the other hand, the first component resides further from the axis than the second component, it may be stated herein that the first component is "radially outward" or "outboard" of the second component. The term "axial" refers to movement or position parallel to an axis. Finally, the term "circumferential" refers to movement or position around an axis. It will be appreciated that such terms may be applied in relation to the center axis of the turbine.

In addition, several descriptive terms may be used regularly herein, as described below. The terms "first," "second," and "third," may be used interchangeably to distinguish one component from another and are not intended to signify location or importance of the individual components.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components but do not preclude the presence or addition of one or more other features, integers, steps, operations, elements, components, and/or groups thereof. "Optional" or "optionally" means that the subsequently described event or circumstance may or may not occur or that the subsequently describe component or element may or may not be present, and that the description includes instances where the event occurs or the component is present and instances where it does not or is not present.

Where an element or layer is referred to as being "on," "engaged to," "connected to" or "coupled to" another element or layer, it may be directly on, engaged to, connected to, or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Gas turbine fuels can range from natural gas and high-quality liquid distillate fuels to crude oils and low-grade refinery residues and combustible residual gases from some processes like steel manufacturing. For some gas turbine fuels, there may be additives needed for efficiency and effective operation of a gas turbine. Additives can vary based on the fuel type and the nature and quantity of contaminants from all sources that enter the gas turbine. Additional factors for additive selection, such as but not limited to firing temperature and original equipment manufacturer (OEM) specifications, are also considered.

Many fuel additives are intended to control high temperature corrosion and ash fouling of gas turbine hot gas path section components. Several different corrosion mechanisms can occur during combustion, and generally may be attributed to formation of low melting point ash deposits. These ash deposits may originate from trace metal impurities in gas turbine fuels. For example, heavy fuel oils (HFOs), including but not limited to crude oils and residual-grade fuel oils, typically contain quantities of vanadium (V). Vanadium is a naturally occurring component of petroleum.

During combustion, fuels including vanadium may create vanadic ash deposits. Vanadic ash deposits are formed mainly of vanadium pentoxide ($V_2O_5$), and have a "low" melting point of about 675° C. (1247° F.). At typical gas turbine operating temperatures, vanadic ash deposits are molten. Being molten, vanadic ash deposits may accelerate surface oxidation rate of hot gas path components of gas turbines. Gas turbine hot gas path components include, but are not limited to combustion liners, transition pieces, turbine nozzles, turbine blades, and turbine vanes. Other trace metal impurities, such as lead, and zinc, may also initiate high temperature corrosion, by similar mechanisms.

Alkali metal impurities, namely sodium (Na) and potassium (K), can also cause high temperature corrosion, known as sulfidation corrosion. Sulfidation corrosion involves formation of sodium sulfates, through reaction with fuel sulfur. Sulfidation corrosion results in inter-granular pitting of gas turbine hot gas path components, which is metallurgically undesirable.

In certain regions, especially the Middle East, vanadium and sodium impurities are common in fuel. Thus, lower melting point ash deposits can readily form in a gas turbine system in this region. Accordingly, with non-treated or additive free gas turbine fuel from these regions, a risk of high temperature corrosion in a gas turbine system is increased.

Sodium and potassium salts are water-soluble and can be removed (or at least reduced to within acceptable specification limits) by on-site treatment processes. These on-site treatments processes are known as "fuel washing."

Distillate-grade fuels are not typically washed at the gas turbine power plant. Distillate-grade fuels may often be delivered containing some amount of contamination, such as but not limited to sodium contamination. Moreover, vanadium and other oil-soluble trace metals cannot be removed by fuel washing. Corrosion inhibition processes and treatments to remove some contamination, such as but not limited to vanadium contamination, may have to be achieved using chemical additives, as described herein.

Liquid fuels are not the only source of ash-forming impurities or contamination. Sodium salts and other contaminants can be found in gas turbine fuel and thusly enter gas turbine engine systems in various manners. Contaminants may enter a gas turbine engine system from gas turbine fuel, from compressor inlet air, from water and steam that may be injected for nitrogen oxide (NOx) control, from power augmentation steps, and/or from other such sources. Thus, risk of contamination from non-fuel sources should also be considered in gas turbine engine system applications.

Fuel additives that include magnesium (Mg) can be used to control vanadic ash deposits and vanadic oxidation. Magnesium can modify vanadic ash composition and increase vanadic ash melting points, which reduces the possibility of molten vanadium causing issues. Through combination with $V_2O_5$ at an appropriate magnesium-to-vanadium (Mg/V) treatment ratio, magnesium ortho-vanadate [$3MgO·V_2O_5$] is formed as a new ash component. $3MgO·V_2O_5$ has a high melting point of about 1243° C. (2269° F.). Accordingly, with $3MgO·V_2O_5$ vanadic ash corrosion of a gas turbine engine system is limited and controlled. By ensuring that vanadic ash as a combustion ash does not melt and remains in a solid state on gas turbine blades and vanes, vanadic ash corrosion can be reduced.

Through reaction with sulfur in gas turbine fuel, magnesium inhibition mechanisms through formation of $3MgO·V_2O_5$ also generate magnesium sulfate ($MgSO_4$) as an additional ash component. $MgSO_4$ is water-soluble. Thus, $MgSO_4$ facilitates removal of combustion ash through periodic water washing of gas turbine hot gas path components. The removal of combustion ash can enable power to be recovered that may have been lost due to ash formation on gas turbine hot gas path components.

Chromium (Cr) additives for gas turbine fuels can inhibit sulfidation corrosion promoted by alkali metal contaminants, such as, but not limited to, sodium and potassium. Chromium additives have also been shown to reduce ash fouling. Chromium additive ash fouling reduction may involve formation of volatile compounds with contaminants, which pass through the gas turbine without depositing on hot gas path components. Moreover, additives can include chromium alone, or can be in combination with magnesium and other constituents. Additives containing silicon (Si) can also be added to provide added corrosion protection and improved ash friability from hot gas path components of a gas turbine system.

Magnesium additives are of a sulfonate type chemistry. Sulfonate type chemistry in ash formation is resistant to hydrolysis. Any tendency for gel formation of sulfonate type additives because of water contact with sulfonate ash formations is extremely low. Thus, sulfonate type chemistry additives can mitigate plugging of gas turbine system components, including but not limited to, filters, flow dividers, nozzles, blades, and/or fuel nozzles.

Sulfonate type additives also enable high reactivity during combustion. The high reactivity may permit magnesium to be consumed more efficiently during vanadium inhibition. This high reactivity may be due to extremely small particle sizes of sulfonate type additives, where the particle size of sulfonate type additives are about 5 times smaller than magnesium carboxylate ($C_{10}H_{12}MgN_2O_6$) particles. Accordingly, sulfonate magnesium additives can be safely added to gas turbine fuel, thereby ensuring protection without over-treatment.

As used in this application, "offline washing" is where the gas turbine is spun by an external crank, and the gas turbine is in a cooled state using cranking speed. When a gas turbine is off-line, it is not burning fuel or supplying power. As embodied by the disclosure, conversely, an online process is conducted with the gas turbine being at an operating temperature, burning fuel and supplying power.

Referring now to the drawings, in which like numerals refer to like elements throughout the several views, FIG. 1 illustrates a schematic view of gas turbine engine system or gas turbine engine system 10, as embodied by the disclosure. Gas turbine engine system 10 may include a compressor 15. Compressor 15 compresses an incoming flow of air 20 after air 20 flows through inlet filter house 15'. Compressor 15 delivers the compressed flow of air 20 to a combustor 25. Combustor 25 mixes the compressed flow of air 20 with a pressurized flow of fuel 30 and ignites the mixture to create a flow of combustion gases 35. Although only a single combustor 25 is shown, gas turbine engine system 10 may include any number of combustors 25. The flow of combustion gases 35 is in turn delivered to a gas turbine 40. The flow of combustion gases 35 drives gas turbine 40 to produce mechanical work. Mechanical work produced in gas turbine 40 drives compressor 15 via a shaft 45 and an external load 50, such as but not limited to, an electrical generator and the like.

Gas turbine fuels can range from natural gas and high-quality liquid distillate fuels to crude oils and low-grade refinery residues. Gas turbine engine system 10 may be any one of a number of different gas turbine engines offered by General Electric Company of Schenectady, N.Y., including but not limited to, those such as a 7 or a 9 series heavy duty gas turbine engine, an H class series heavy duty gas turbine engine, such as an HA gas turbine engine, and the like. The gas turbine engine system 10 may have different configurations and may use other types of components. Other gas turbine engines may also be used herein. Multiple gas turbine engines, other types of turbines, and other types of power generation equipment also are also within the scope of the embodiments described herein.

Figure 2:
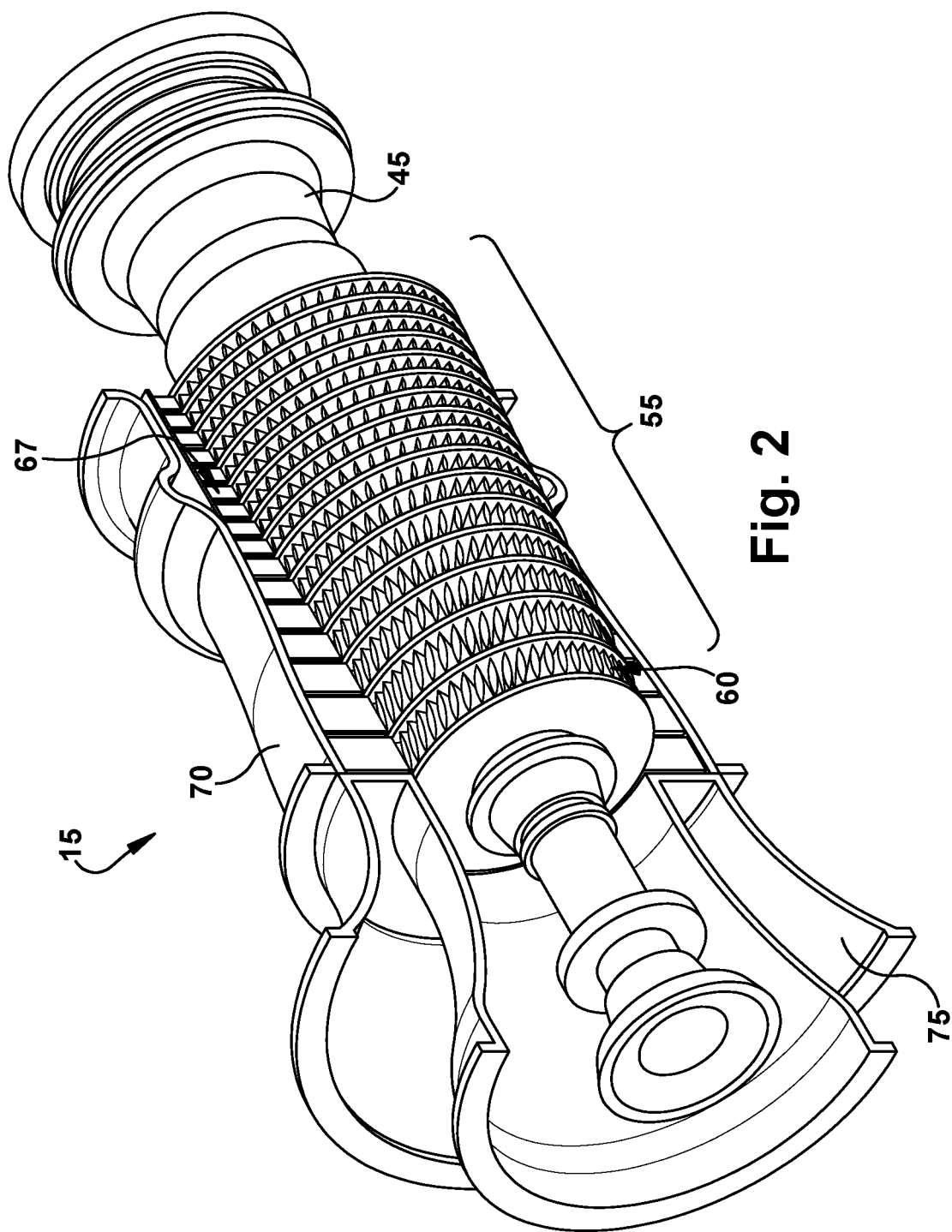
FIG. 2 is a partial perspective view of a portion of the gas turbine engine system of FIG. 1, showing portions of the compressor, the combustor, and the turbine, according to embodiments of the disclosure.

FIG. 2 is an example of a compressor 15 as may be used with gas turbine engine system 10 and the like. Compressor 15 may include a number of stages 55. Although eighteen stages 55 are shown, any number of stages 55 may be used. Each stage 55 includes a number of circumferentially arranged rotating blades 60. Any number of blades 60 may be used. Blades 60 may be mounted onto a rotor wheel 65. Rotor wheel 65 may be coupled to shaft 45 (FIG. 1) for rotation therewith. Each stage 55 also may include a number of circumferentially arranged stationary vanes 67. Any number of vanes 67 may be used. Vanes 67 may be mounted within an outer casing 70. Outer casing 70 may extend from a bellmouth 75 towards gas turbine 40. The flow of air 20 (FIG. 1) thus enters compressor 15 about bellmouth 75 and is compressed through blades 60 and vanes 67 of stages 55 before flowing to combustor 25 (FIG. 1). Bellmouth 75 may be provided with water wash injection nozzles (not illustrated for ease of understanding and clarity) for applying water and/or detergents to compressor blades 60 and vanes 67 of stages 55. However, the water and/or detergent may not flow to all blades 60 and vanes 67 of stages 55 of compressor 15. Moreover, compressor water wash systems do not provide a direct path to gas turbine components, including but not limited to hot gas path components including stage one nozzles (S1N) and stage 2 nozzles (S2N), as well as associated wheel space cavities of gas turbine 40 (FIG. 1) that may get contamination thereon. Accordingly, as embodied by the disclosure, providing injection points for washing gas turbine components, including but not limited to hot gas path components including stage 1 nozzles (S1N) and stage 2 nozzles (S2N), as well as associated wheel space cavities, may be obtained by locating injection closer to the gas turbine itself.

Figure 3:
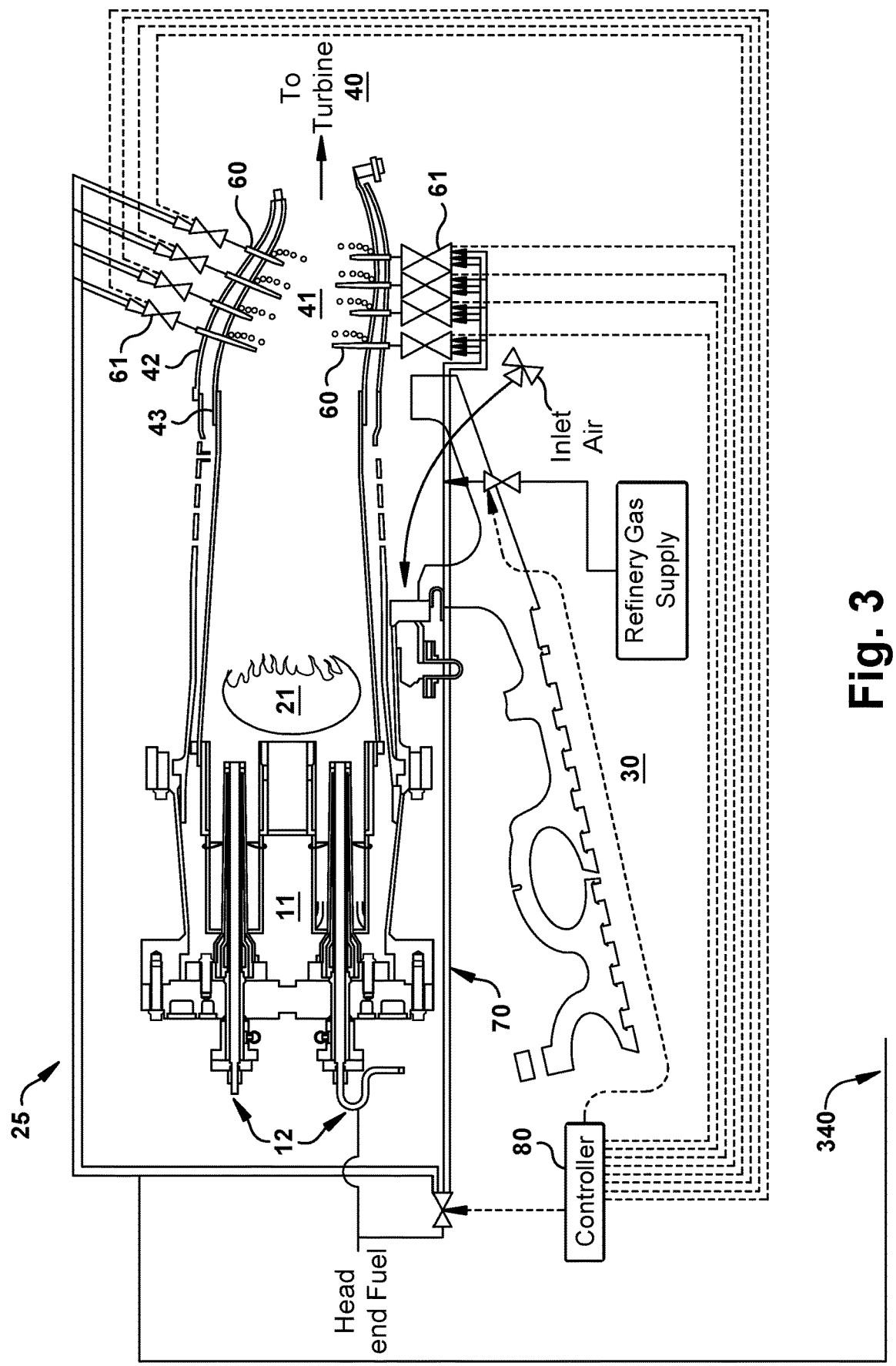
FIG. 3 is a schematic diagram of a gas turbine engine system including a gas turbine engine, late lean injectors, a wash system, and a system controller, according to embodiments of the disclosure.

With reference to FIG. 3, a combustor 25 includes a first interior 21 in which a first fuel supplied thereto by fuel circuit is combustible, and a transition zone 43 to gas turbine 40. Gas turbine 40 includes rotating turbine blades and nozzles in stages, into which products of at least the combustion are receivable to power rotation of turbine blades. The transition zone 43 fluidly couples combustor 25 to turbine 40. Transition zone 43 includes a second interior 41 into which a second fuel is supplied to further the combustion. As shown, combustor 25 and transition zone 43 combine with one another to generally have a form of a head end 11.

As illustrated in FIG. 3, head end 11 may include multiple premixing nozzles 12. However, other head end 11 configurations are possible. It is understood that versions of other head end 11 configurations may be late lean injection (LLI) or axial fuel staging (AFS) combustors (to be described hereinafter with respect to secondary fuel injected into combustor 25 AT fuel injectors 60) compatible. For purposes of this description, LLI and AFS are similar and equivalent. An LLI compatible combustor is a combustor with either an exit temperature that exceeds about 2500° F. or about 1370° C., or a combustor that handles fuels with components that are more reactive than methane with a hot side residence time greater than 10 milliseconds (ms).

A plurality of late lean fuel injectors 60 are structurally supported by an exterior wall of transition zone 43 or by an exterior wall of a sleeve 42 around transition zone 43 and extend into second interior 41 to varying depths. With this configuration, fuel injectors 60 may be configured to provide late lean injection (LLI) fuel staging capability. That is, fuel injectors 60 are each configured to supply a second fuel (i.e., LLI fuel) to second interior 41 by, e.g., fuel injection in a direction that is generally transverse to a predominant flow direction. Fuel injectors 60 may inject fuel in this manner through transition zone 43, in any one of a single axial stage, multiple axial stages, a single axial circumferential stage, and/or multiple axial circumferential stages. Conditions within combustor 25 and transition zone 43 are thus staged to create local zones of stable combustion.

As embodied by the disclosure, an aspect provides a single axial stage that includes operating a single fuel injector 60. Alternatively, multiple axial stages may be operated at multiple axial locations at transition zone 43. Further, embodiments may include a single axial circumferential stage operating fuel injector 60 disposed around a circumference of a single axial location of transition zone 43. In other embodiments, multiple axial circumferential stages may be operating fuel injectors 60 disposed around a circumference of the transition zone 43 at multiple axial locations.

Here, where multiple fuel injectors 60 are disposed around a circumference of transition zone 43, fuel injectors 60 may be spaced substantially evenly or unevenly from one another. As a non-limiting illustration, eight or ten fuel injectors 60 may be disposed at a particular circumferential stage, and for example with two, three, four or five or more fuel injectors 60 installed with varying degrees of separation from one another around transition zone 43. Also, where multiple fuel injectors 60 are disposed at multiple axial stages of transition zone 43, fuel injectors 60 may be in-line and/or staggered with respect to one another.

During operations of gas turbine engine system 10, each fuel injector 60 may be jointly or separately activated or deactivated to form one of the single axial stage, the multiple axial stages, the single axial circumferential stage, and the multiple axial circumferential stages. Thus, in an aspect of the embodiments, fuel injectors 60 each may be supplied with LLI fuel by a fuel injector 60 port or valve 61 (hereinafter "valve" 61) disposed between a corresponding fuel injector 60 and a fuel circuit. Valve 61 signal communicates with a controller 80 that sends a signal to valve 61 that causes the valve 61 to open or close and to thereby activate or deactivate corresponding fuel injector 60.

Thus, if each fuel injector 60 is to be simultaneously activated (i.e., multiple axial circumferential stages), controller 80 signals to each of the valves 61 to open and thereby activate each of the fuel injectors 60. Conversely, if each fuel injector 60 of a particular axial stage of transition zone 43 is to be activated (i.e., single axial circumferential stage), controller 80 includes an element (e.g., but not limited to an electro-mechanical transducer) configured to convert an electrical signal from controller 80 to a corresponding adjustment to valves 60, 61. Signals to each of valves 61 may correspond to only the fuel injectors 60 of the single axial circumferential stage to open and thereby activate each of the fuel injectors 60. Of course, this control system is merely illustrative and it is understood that multiple combinations of fuel injector configurations are possible and that other systems and methods for controlling the activation and deactivation of at least one of fuel injectors 60 are available.

In accordance with another aspect of the disclosure, a method of operating a gas turbine engine system 10, in which a turbine 40 is fluidly coupled to a combustor 25 by a transition zone 43 interposed therebetween, is provided. The method includes supplying a first fuel to a first interior 21 within combustor 25, combusting the first fuel in first interior 21 within combustor 25, supplying a second fuel to second interior 41 within transition zone 43 in any one of a single axial stage, multiple axial stages, a single axial circumferential stage and multiple axial circumferential stages, and combusting the second fuel and a stream of combustion products, received from first interior 21, in second interior 41 within the transition zone.

Supplying of the second fuel to second interior 41 in the single axial stage may include activating a single fuel injector 60. Supplying the second fuel to the second interior 41 in the multiple axial stages may include activating multiple fuel injectors 60 respectively disposed at multiple axial locations of the transition zone 43. Supplying the second fuel to second interior 41 in the single axial circumferential stage also includes activating multiple fuel injectors 60 respectively disposed around a circumference of transition zone 43 at a single axial location thereof. Additionally, supplying the second fuel to second interior 41 in the multiple axial circumferential stages includes activating multiple fuel injectors 60 disposed around a circumference of transition zone 43 at multiple axial locations thereof.

Figure 4:
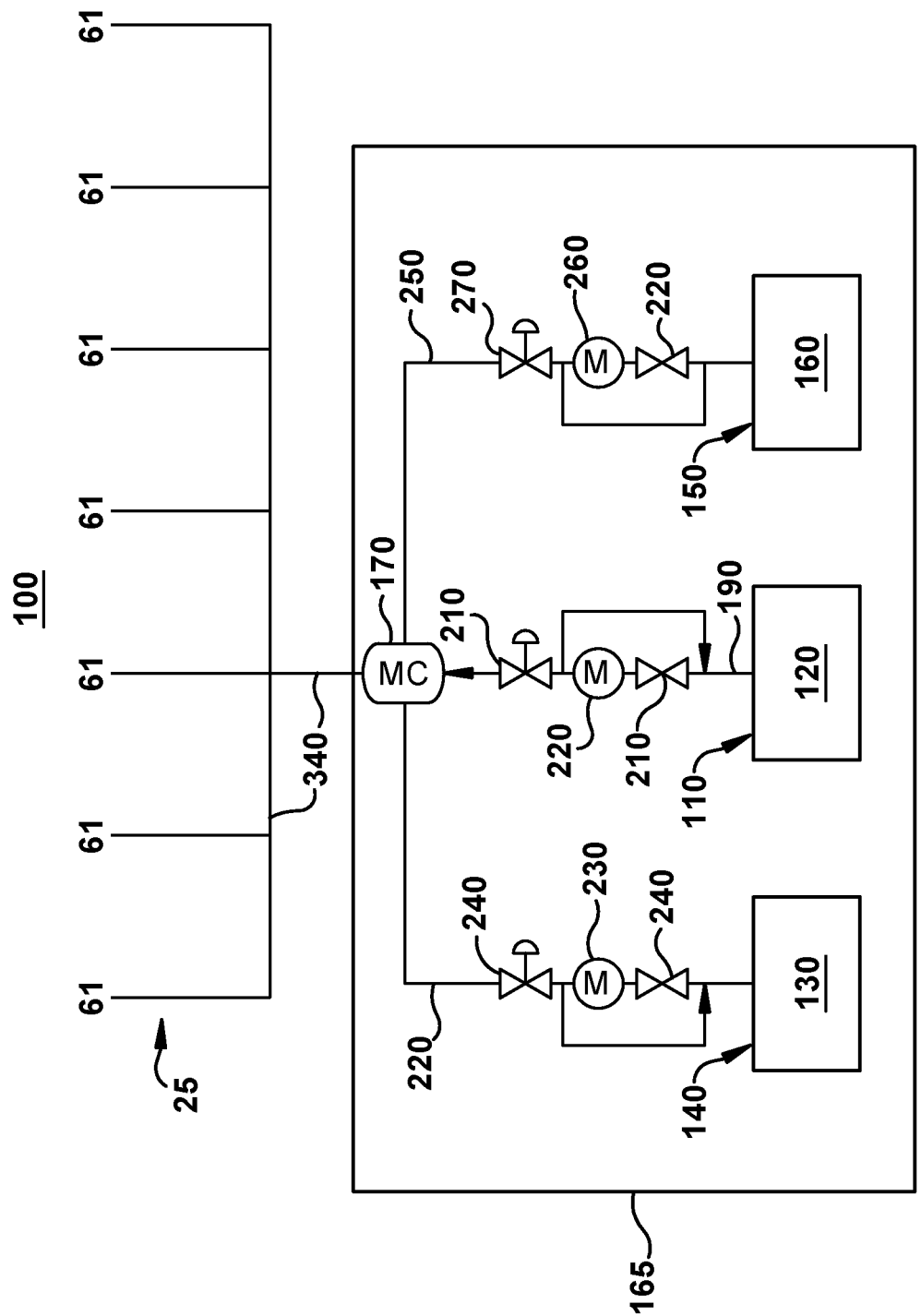
FIG. 4 is a schematic diagram of a wash system leading to late lean injectors of a combustor, according to embodiments of the disclosure.

FIG. 4 shows a wash system 100 as embodied by the disclosure. Wash system 100 may include a water source 110. The water source 110 may have any size, shape, or configuration. The water source 110 may have a volume of water 120 therein. Wash system 100 also may include a detergent source 130. The detergent source 130 may have any size, shape, volume, or other configuration. The detergent source 130 may have a supply of a detergent 140 therein. The detergent 140 may be any type of cleaning solution. The detergent 140 may be diluted with the water 120 in a predetermined ratio.

In another aspect of the embodiments, wash system 100 also may include a chemical source 150. Chemical source 150 may have any size, shape, or configuration. In certain embodiments, chemical source 150 may have a volume of an anti-static solution 160 therein. Anti-static solution 160 may be any type of anti-static fluid. Anti-static solution 160 may be diluted with the water 120 in a predetermined ratio. Water source 110, detergent source 130, and/or chemical source 150 may be positioned on a wash skid 165 in whole or in part. Wash skid 165 may be mobile and may have any size, shape, or configuration. Other components and other configurations may be used herein. Each source 110, 130 and 150 are referred to in general as a "source" and may provide particular wash materials, such as, but not limited to, being a water source 110; a detergent source 130; and a solution or chemical source 150. Each source 110, 130, and 150 may include level sensors (not illustrated in FIG. 3, see FIG. 6) to provide an indication of source content level. Moreover, as used herein, source(s) 110, 130, and 150 may be referred generally as a "source" or alternatively, with respect to particulars of the wash material(s) it may include.

Figure 5:
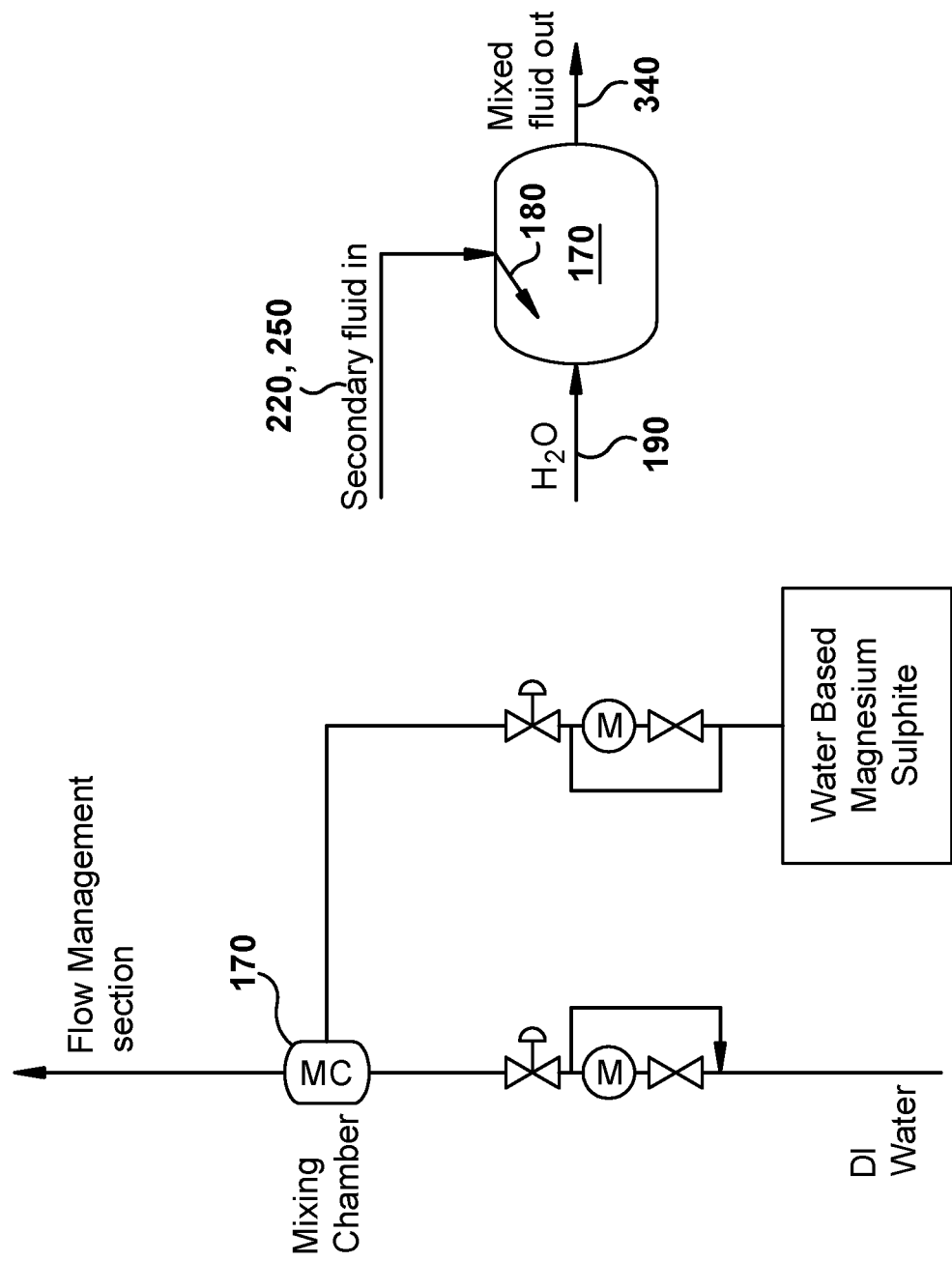
FIG. 5 is a detailed schematic diagram of a mixing chamber and related supply lines as may be used in the wash system, according to embodiments of the disclosure.

Wash system 100 also may include a mixing chamber 170. Mixing chamber 170 may be used to mix detergent 140 with water 120, or anti-static solution 160 with water 120. Other combinations of fluids may also be used. Non-diluted fluids also may be used herein. FIG. 5 illustrates a non-limiting illustrative mixing chamber 170. Mixing chamber 170 may include one or more of angled counter flow nozzles 180 for the flow of detergent 140 and/or anti-static solution 160 or other type of secondary flows. Flow of detergent 140 or anti-static solution 160 may be injected at a non-diametrically opposed or counter angle via angled counter flow nozzles 180 into an incoming flow of water or other type of primary flow for good mixing therein without the use of moving parts. Effective mixing also may be provided by injecting flow of detergent 140 or anti-static solution 160 at a higher pressure as compared to flow of water 120. Mixing chamber 170 may have any size, shape, or configuration. The one or more angled counter flow nozzles 180 extend into the mixing chamber at an angle with respect to a central axis of mixing chamber 170 and can be configured to inject a first fluid at an angle in a direction counter to a flow of the water in mixing chamber 170.

As shown in FIG. 4, water source 110 may be in communication with mixing chamber 170 via a water line 190. Water line 190 may have a water pump thereon. Water pump may be, e.g., of conventional design. Water line 190 may have a pair of water line isolation valves 210 thereon. Detergent source 130 may be in communication with mixing chamber 170 via a detergent line 220. Detergent line 220 may have a detergent pump 230 thereon. Detergent pump 230 may be, e.g., of conventional design. Detergent line 220 may have a pair of detergent line isolation valves 240 thereon. Anti-static solution source 160 may be in communication with mixing chamber 170 via an anti-static solution line 250. Anti-static solution line 250 may have an anti-static solution pump 260 thereon. Anti-static solution pump 260 may be of conventional design. Anti-static solution line 250 may have a pair of anti-static solution line isolation valves 270 thereon. Other components and other configurations may be used herein.

Wash system 100 also may include a conduit or line 340, i.e., an output line from mixing chamber 170. In this example, with respect to FIGS. 3 and 4, line 340 leads from skid 165 to one or more of valves 61 for late lean injection (axial fuel staging) in combustor 25. Thus, wash materials, such as at least one of water 120, detergent 140, anti-static solution 160, and passivation solution (to be described hereinafter) can be fed to combustor 25. When fed to combustor 25 at valves 61 for late lean injection, wash materials are proximate hot gas path components of gas turbine 40, and in particular S1N of gas turbine 40. Therefore, as at least one of washing, detergent, anti-static, and passivation solution materials can proceed to late lean injectors valves 61 of gas turbine 40 (FIG. 4) via combustion gas 35 (FIG. 1) streams to act on and clean gas turbine 40 components, including but not limited to, blades and nozzles of gas turbine 40.

Figure 6:
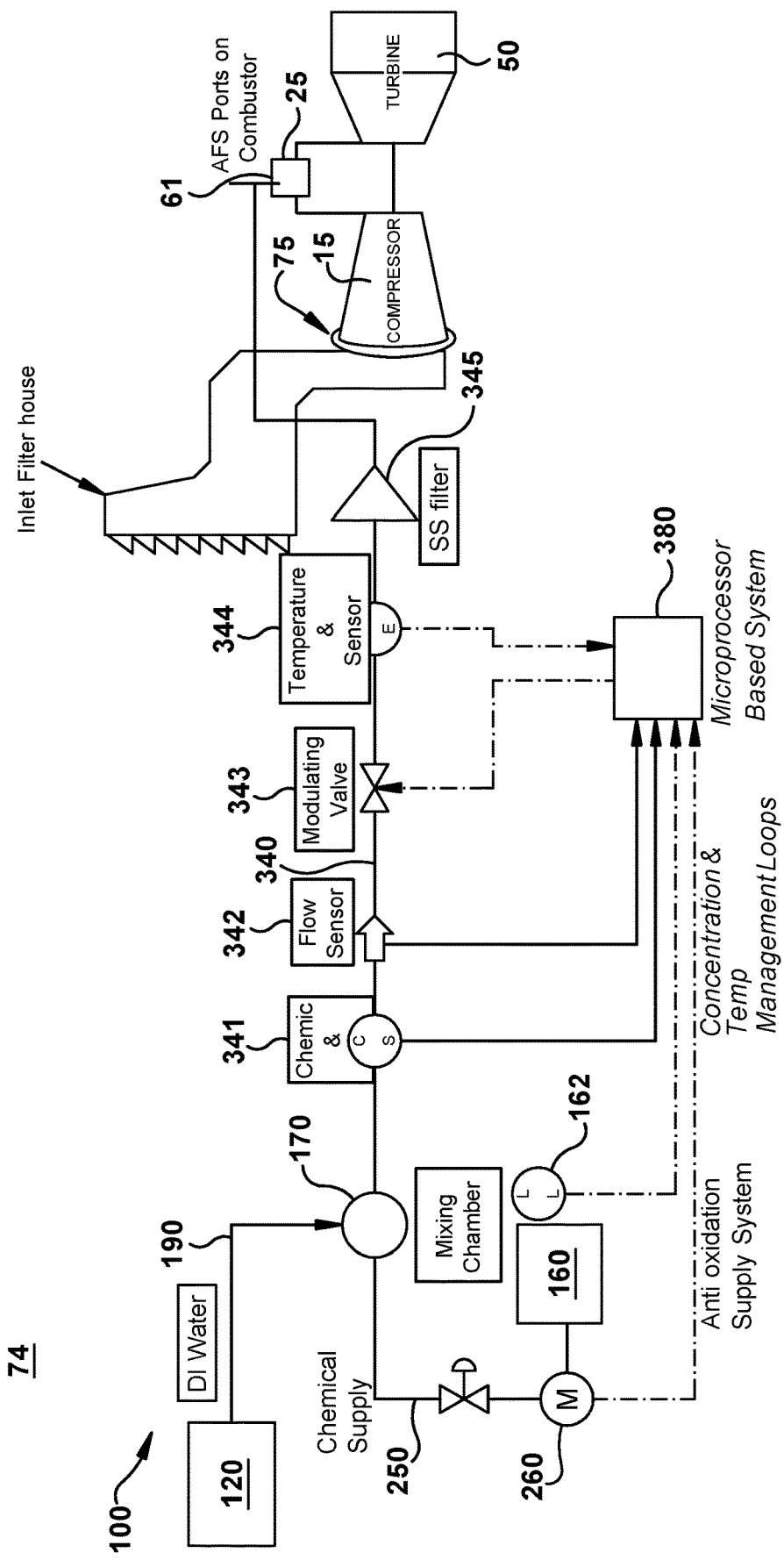
FIG. 6 is a schematic diagram illustrating details of a wash system, according to embodiments of the disclosure.

With respect to FIGS. 4 and 6, a wash controller 380 may operate wash system 100. Wash controller 380 may provide at least one of water 120, detergent 140, anti-static solution 160, and/or passivation solution (as described hereinafter) to mixing chamber 170 and then to combustor 25 in appropriate ratios thereof. Wash controller 380 may be any type of programmable logic device (as discussed hereinafter) and may be in communication with or part of an overall control system of gas turbine engine system 10. Specifically, wash controller 380 may control valve interlocks, fluid levels, pump operation, connectivity signals, flow sensors, temperature, pressure, timing, and the like, as discussed herein. Various types of sensors (such as but not limited to, thermometers, flow meters, pressure sensors, and the like.) may be used herein to provide feedback to wash controller 380. Access to wash controller 380 and operation parameters herein may be restricted to ensure adequate cleaning and coverage.

In use, wash skid 165 with fluid sources 110, 140, 150 may be positioned adjacent gas turbine engine system 10 (FIG. 1). Alternatively, the fluid sources 110, 140, 150 may be more permanently located nearby in whole or in part, to gas turbine engine system 10.

In certain aspects of the embodiments, wash controller 380 may determine a ratio of water 120 to detergent 130. Wash controller 380 may activate water pump 220 and/or detergent pump 230 to pump corresponding volumes of water 120 and detergent 140 to mixing chamber 170. A portion of a detergent/water mixture from mixing chamber 170 may flow through conduit or line 340 to a connection with one or more of valves 61 of combustor 25 for resultant flow to S1N of gas turbine 40. Flow may occur with gas turbine 40 off-line with gas turbine 40 under cranking power to permit flow from combustor 25 to gas turbine 40. Also, the flow of mixture through conduit or line 340 may occur when gas turbine 40 is on-line with mixture flowing with combustion gas 35 to gas turbine 40. Wash controller 380 then may turn pumps 220,230 off once the predetermined volume of detergent/water mixture 390 has been injected into valves 61 of combustor 25. Wash controller 380 may again activate water pump 220 to provide a water rinse, if requested. A volume of water 120 in a rinse may vary.

Wash system 100 can provide improved cleaning and application of anti-static solution 160 throughout combustor 25 including through valves 61 to be fed to gas turbine 40, including washing and treating, for example, stage one and two nozzles (S1N)(S2N) and associated wheel space cavities. The increased coverage of anti-static solution 160 may enhance the ability to suppress the electrostatic attraction of material on the gas turbine blades as well as the stationary nozzles with a reduced propensity to form deposits, such as ash contaminants. Anti-static coverage may provide water wash recovered gas turbine operational gains for a longer period of time. Accordingly, gas turbine engine system 10 may have improved sustainable performance characteristics. Moreover, wash system 100 uses existing LLI (axial fuel staging) piping of combustor 25 such that reconstruction or retrofitting is not required.

Wash system 100 also may provide the ability to control an injection rate and quantity of anti-static solution 160 to ensure adequate coverage to gas turbine 40 and including stage one and two nozzles (S1N and S2N) and associated wheel space cavities. Wash controller 380 may vary the ratio and volume of a detergent/water mixture and/or anti-static solution/water mixture that may be delivered to combustor 25.

Embodiments of the disclosure may provide off-line cleaning of combustor 25, gas turbine 40, and especially stage one and two nozzles (S1N and S2N) and associated wheel space cavities of gas turbine 40. With reference to FIG. 6, where like reference numerals refer to like elements, and a further discussion of those elements is omitted for clarity and brevity, a schematic illustration of a gas turbine engine system 10 is illustrated with a wash system 100. Off-line cleaning as embodied by the disclosure provides anti-oxidant cleaning to stage one and two nozzles (S1N and S2N) and associated wheel space cavities of gas turbine 40. Wash system 100 provides a mixture of demineralized/deionized water and at least one of magnesium (Mg), yttrium (Y) for vanadium mitigation, as described here, or detergent from wash system 100 injected into combustor 25 through late lean injection (axial fuel staging) valves 61. Moreover, water and at least one of magnesium (Mg), yttrium (Y), or detergent from wash system 100 can be delivered to the off-line gas turbine engine system 10 as a foam or water, for example, in a homogeneous stream at late lean injector valves 61.

In aspects of the embodiments, anti-oxidant cleaner, water and magnesium, is provided for targeted stage one and two nozzles (S1N and S2N) and associated wheel space cavities in situ cleaning in gas turbine 40. Wash system 100 and the associated process use existing LLI (axial fuel staging) valves 61 to dispense a predetermined mixture of demineralized water and magnesium into combustor 25. As embodied by the disclosure, wash system 100, when applied to a gas turbine engine system 10 can: remove vanadium, including vanadium in ash form, from a stage one and stage two nozzle (S1N) and (S2N) and associated wheel space cavities and/or other internal components of gas turbine 40; enhance the ability to retain recovered performance of gas turbine engine system 10 for longer durations after cleaning; mitigate against nozzle plugging and rust formation/oxidation in gas turbine engine system 10 and especially in gas turbine 40; clean and remove ash formations; clean and remove oxidation and particulate from combustor surfaces; provide increased plant reliability and efficiency that is attributable to reduction in cooling air path plugging; and improve reliability of gas turbine engine systems operating on heavy fuel oils.

With reference to FIGS. 4-7, wash system 100 provides wash materials to combustor 25 and then to stage one and two nozzles (S1N and S2N) and associated wheel space cavities for in situ cleaning in gas turbine 40 when gas turbine engine system 10 is offline. It is to be noted that compressor washing through providing wash materials at the bellmouth 75 (FIG. 2) of compressor 15 (FIG. 1) may still be provided with any operation and aspect described herein, as embodied by the disclosure. However, the exact system, process, and other details with respect to compressor washing are not germane to aspects of the embodiments, and further discussion will be omitted.

Conduit or line 190 extends from water supply 120 and line 250 extends from supply 160 (such as a chemical supply of, for example, a water-based magnesium sulphite), and lines 190 and 250 meet at mixing chamber 170. From mixing chamber 170, line 340 extends to combustor 25. Line 340 may include at least one of chemical sensor 341 for detecting chemical characteristics of mixture, flow senor 342, modulating or control valve 343, temperature sensor 344, and filter 345. Each of at least one of chemical sensor 341, flow senor 342, modulating valve 343, temperature sensor 344, as well as motor 220 and chemical source 150 level sensor 162, communicate with controller 380. Accordingly, controller 380 may regulate and manage operation of wash system 100 in its off-line operation in accordance with the embodiments herein.

Another aspect of the embodiments provides cleaning of combustor 25, gas turbine 40, and in particular stage one and stage two nozzles (S1N) and (S2N) and associated wheel-space cavities of gas turbine 40 and additionally ash formation mitigation, during operation of gas turbine engine system 10. Reference can again be made to FIGS. 4-6, wash system 100 provides wash materials to combustor 25 and then stage one and two nozzles (S1N and S2N) and associated wheel space cavities for in situ cleaning in gas turbine 40, and also provides ash formation mitigation materials to gas turbine engine system 10 during operation of gas turbine engine system 10.

As embodied by the disclosure, this aspect of the wash system 100 provides and distributes low temperature ash formation mitigants with wash materials from combustor 25 and its late lean injection valves or nozzles 61, and then to gas turbine 40 internal components, including stage one and two nozzles (S1N and S2N) and associated wheel space cavities of gas turbine 40. Wash system 100, as per this aspect of the embodiments, provides a mixture of demineralized/deionized water from wash system 100 injected into combustor 25 through late lean injection (axial fuel staging) valves 61. Also, wash system 100 may also provide yttrium, magnesium or any now known or later developed low temperature ash formation mitigant, in sources 130 and/or 150 from wash system 100 into existing late lean injection (axial fuel staging) valves or nozzles 61 of combustor 25. Non-limiting types of low temperature ash formation mitigant may include water or oil based yttrium or magnesium. As noted herein, wash system 100 provides wash water, such as demineralized/deionized water, and low temperature ash formation mitigant into combustor 25 LLI (axial fuel staging) valves 61. As embodied by the disclosure, the late lean injection (axial fuel staging) valves 61 are ahead of stage one and two nozzles (S1N) and (S2N) and associated wheel space cavities in gas turbine 40 and flow of combustion gases 35 is in turn delivered to gas turbine 40. Low temperature ash formation mitigant delivered to LLI (axial fuel staging) valves 61 is conveyed to internal components of gas turbine 40 with the flow 35 of combustion gases.

As embodied by the disclosure, method and system for ash formation mitigation and cleaning during operation of gas turbine engine system 10 can: reduce a rate of ash formation on a gas turbine stage one and two nozzles (S1N and S2N), associated wheel space cavities and other gas turbine internal turbine components; enhance the ability to retain recovered performance of gas turbine engine system 10 for longer durations after cleaning; mitigate against nozzle plugging, hot corrosion/oxidation, aero shape/profile deformation that may be due to plugging; enhances the ability to meet and exceed degradation guarantee bonus opportunity, especially in gas turbine engines that operate on heavy fuel oxide (HFO) gas turbines and gas turbine units that rely on gas fuel with high concentrations of vanadium and other ash forming impurities; increased plant reliability, output and efficiency that can be attributable to reduction in nozzle effective area and changes to blade aerodynamic profiles; clean and remove ash formations; clean and remove oxidation and particulate from combustor surfaces; and provide increased plant reliability and efficiency that is attributable to reduction in cooling air path plugging.

As embodied by the disclosure, wash system 100 for ash formation mitigation during gas turbine engine system 10 (FIG. 1) operation can be illustrated by the configuration of FIG. 6. Line 190 extends from water supply 110 and line 250 extends from chemical source 150, for example, chemical source 150 in this aspect includes a volume of yttrium, magnesium or another low temperature ash formation mitigant, and lines 190 and 250 meet at mixing chamber 170. From mixing chamber 170, line 340 extends to combustor 25. Line 340 may include at least one of chemical sensor 341, flow senor 342, modulating valve 343, temperature sensor 344, and filter 345. Each of at least one of chemical sensor 341, flow senor 342, modulating valve 343, temperature sensor 344, as well as motor 200, chemical source 150 level sensor 162 communicate with controller 380. Accordingly, controller 380 may regulate and mange operation of wash system 100 in its off-line operation in accordance with the embodiments herein.

A further aspect of the embodiments provides off-line cleaning and passivation of combustor 25, gas turbine 40, and especially stage one and stage two nozzles (S1N) and (S2N) and associated wheel space cavities of gas turbine 40. With continued reference to FIGS. 6 and 7, where like reference numerals refer to like elements, and a further discussion of those elements is omitted for clarity and brevity, a schematic illustration of a gas turbine engine system 10 is illustrated with a wash system 100. Off-line cleaning as embodied by the disclosure, provides anti-oxidant cleaning and passivation of combustor 25, gas turbine 40, and especially stage 1 nozzle of gas turbine 40 to stage 1 nozzle of gas turbine 40. Wash system 100 provides a mixture of demineralized/deionized water and at least one of a polyamine or magnesium (Mg) from wash system 100 injected into combustor 25 through late lean injection (axial fuel staging) valves 61.

In this aspect of the embodiments, mixture of demineralized/deionized water and at least one of a polyamine or magnesium is provided for targeted stage one and two nozzles (S1N and S2N) and associated wheel space cavities in situ cleaning in gas turbine 40, including stage one and two nozzles (S1N and S2N) and associated wheel space cavities of gas turbine 40, when gas turbine 40 is off-line. Wash system 100 and the associated process use existing late lean injection (axial fuel staging) valves 61 to dispense a predetermined mixture of demineralized/deionized water and at least one of a polyamine or magnesium into combustor 25, from where predetermined mixture of demineralized water and magnesium can flow into gas turbine 40. As embodied by the disclosure, wash system 100 of FIG. 6, when applied to a gas turbine engine system 10 can coat internal gas turbine components to passivate them. Included in the internal gas turbine components that are coated and passivated are stage one and stage two nozzles (S1N) and (S2N) plus associated wheel space cavities and/or other internal components of gas turbine 40. Passivation, as embodied by the disclosure, can: enhance the ability to retain recovered performance of gas turbine engine system 10 for longer durations after cleaning; mitigate against nozzle plugging and rust formation/oxidation in gas turbine engine system 10 and especially in gas turbine 40; clean and remove ash formations; may reduce severity and frequency to perform degradation based maintenance; clean and remove oxidation and particulate from combustor surfaces; provide increased plant reliability and efficiency that is attributable to reduction in cooling air path plugging; reduce potential crack propagation and surface degradation of stage one and two nozzles (S1N and S2N) and associated wheel space cavities and/or other gas turbine components; and improve reliability gas turbine engines operating on heavy fuel oils.

With reference to FIGS. 4-7, wash system 100 provides mixed demineralized/deionized water and at least one of a polyamine or magnesium to combustor 25 and then for S1N in situ cleaning in gas turbine 40 when gas turbine engine system 10 is offline. Being offline means it is to be noted that compressor washing through providing wash materials at the bellmouth 75 (FIG. 2) of compressor 15 (FIG. 1) may still be provided with any operation and aspect described herein, as embodied by the disclosure. However, the exact system, process, and other details with respect to compressor washing are not germane to aspects of the embodiments, and further discussion will be omitted.

Line 190 extends from water supply 110 and line 250 extends from chemical supply 150, for example, a mixture of demineralized/deionized water and at least one of a polyamine or magnesium, and lines 190 and 250 meet at mixing chamber 170. From mixing chamber 170, line 340 extends to combustor 25. Line 340 may include at least one of chemical sensor 341, flow senor 342, modulating valve 343, temperature sensor 344, and filter 345. Each of at least one of chemical sensor 341, flow senor 342, modulating valve 343, temperature sensor 344, as well as motor 200 and chemical source 150 level sensor 162 communicate with controller 380. Accordingly, controller 380 may regulate and mange operation of wash system 100 in its off-line operation in accordance with the embodiments herein.

As embodied by the disclosure, the passivation material, for example but not limited to at least one of a polyamine or magnesium, can be provided in a liquid form or a foam form. Aspects of the disclosure enable the mixture of demineralized/deionized water and at least one of a polyamine or magnesium to flow from late lean injection valves or nozzles to stage one and two nozzles (S1N and S2N) and associated wheel space cavities of gas turbine 40 for passivation of stage one and two nozzles (S1N and S2N) and associated wheel space cavities, and other internal gas turbine components.

An anti-corrosion mixture, as embodied by the disclosure, can include an anti-corrosion agent and water. Anti-corrosion mixture can be supplied as an aqueous solution (e.g., using water as a liquid carrier) to combustor 25 and then to gas turbine 40 sections of gas turbine engine system 10. Anti-corrosion mixture can coat gas turbine engine components therein with a metal passivation coating which mitigates corrosion on those coated parts.

Magnesium sulfate can be used as a cleaning agent, in accordance with certain aspects of the embodiments. For applications in which gas turbine engine system 10 employs heavy oil as a fuel, heavy oil can be treated with a vanadium-based corrosion/deposit inhibitor. A vanadium-based corrosion/deposit inhibitor can form slag in gas turbine engine system 10 during operation. Magnesium sulfate may prevent formation of vanadium-based slag promoted by the use of crude, heavy oils as a gas turbine fuel. Magnesium sulfate, as a vanadium-based corrosion/deposit inhibitor, can be connected to a water-based magnesium sulfate solution, in certain aspects of the embodiments.

As embodied by the disclosure, anti-corrosion mixture can be pre-mixed (in mixing chamber 170) and supplied to gas turbine engine system 10. Further, anti-corrosion mixture can be provided to combustor 25 through washing system 100.

Anti-corrosion mixture imparts corrosion resistance and/or inhibition to gas turbine engine system 10 and gas turbine 40 including its stage one and stage two nozzles (S1N) and (S2N) and associated wheel space cavities by metal passivation. Metal passivation provides an anti-corrosion coating on the metal and/or metal alloy substrates in gas turbine engine system 10 with which the anti-corrosion mixture, as embodied by the disclosure, comes into contact via entry at late lean injection valves 61 of combustor 25, as discussed above. A resultant anti-corrosion coating therefore (partially or fully) coats gas turbine 40 especially its stage one nozzles, and various metallic hot gas path components, such as gas turbine blades and other nozzles).

Metal passivation imparts a protective shield to metal and/or metal alloy substrates from environmental factors, such as but not limited to, high temperatures, combustion by-products, debris, etc. exhibited in gas turbine engines by forming a metal oxide layer/coating. Metal oxide layer/coating protects metal or metal alloy substrate components of gas turbine 40 from corrosive species. Anti-corrosion coatings can be seen as a molecular layer, or on other words, a micro coating. In one aspect of the disclosure, anti-corrosion coating also strengthens bonds in the metal or metal alloy substrate of gas turbine engine system 10. In another aspect of the embodiments, significant thermal decomposition of anti-corrosion coating may be avoided at temperatures below 500° C. In yet another aspect, successive anti-corrosion treatment cycles can be applied to the gas turbine engine system 10 using the wash system 100 described herein, resulting in a multi-layer anti-corrosion coating.

Anti-corrosion mixtures can include water and an anti-corrosion agent in a particularly selected, predetermined ratio. Any anti-corrosion agent/inhibitor that is suitable to impart an anti-corrosion coating may be employed. In an embodiment, the anti-corrosion agent is an organic amine. Amine as a corrosion agent/inhibitor by absorbing at the metal/metal oxide surface of components in gas turbine engine system 10, thereby restricting access of potentially corrosive species (e.g., dissolved oxygen, carbonic acid, chloride/sulfate anions, etc.) at a metal or metal alloy substrate surface of the gas turbine engine system 10 component. In another embodiment, the anti-corrosion agent/inhibitor can be two or more organic amines. In yet another embodiment, anti-corrosion agent/inhibitor may be a polyamine. As used herein, the term "polyamine" refers to an organic compound having two or more primary amino groups, $NH_2$. In still another embodiment, the anti-corrosion agent/inhibitor further includes a volatile neutralizing amine, which can neutralize acidic contaminants and elevate pH into an alkaline range, and with which protective metal oxide coatings are particularly stable and adherent.

In another aspect of the embodiments, non-limiting examples of the anti-corrosion agent/inhibitor include, but are not limited to, cyclohexylamine, morpholine, monoethanolamine, N-9-Octadecenyl-1,3-propanediamine, 9-octadecen-1-amine, (Z)-1-5, dimethylaminepropylamine (DMPA), diethylaminoethanol (DEAE), and the like, and combinations thereof. In a further embodiment, an amount of the anti-corrosion agent/inhibitor in the anti-corrosion mixture is from 5 parts per million (ppm) to 1000 ppm. In another embodiment, an amount of the anti-corrosion agent/inhibitor in the anti-corrosion mixture is provided in a range from about 50 ppm to about 800 ppm. In yet another embodiment, the amount of the anti-corrosion agent/inhibitor in the anti-corrosion mixture is provided in a range from about 100 ppm to about 500 ppm.

In a particular aspect of the embodiments, the amount of the anti-corrosion agent/inhibitor in a first anti-corrosion mixture supplied to late lean injection valves 61 of combustor 25 is from 5 ppm to 1000 ppm.

Anti-corrosion mixtures including water and anti-corrosion agent/inhibitor are introduced into gas turbine engine system 10 via the LLI valves 61, as discussed above, are in an aqueous solution. As used herein, "aqueous solution"

refers to a liquid phase medium. In an embodiment of the disclosure, the aqueous solution is a liquid phase medium, which is devoid of polyamine gas, water vapor (such as steam), and/or air. Water acts as a liquid carrier for anti-corrosion agent/inhibitor, which is also in a liquid phase. Water thus carries anti-corrosion agent/inhibitor through piping 340 and into selected regions of combustor 25 and gas turbine 40, coating the components therein with the anti-corrosion coating.

As will be appreciated by one skilled in the art, controller 80 and controller 380, as embodied by the disclosure, may be embodied as a system, method or computer program product. Accordingly, controller 80 and controller 380, as embodied by the disclosure, may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, controller 80 and controller 380, as embodied by the disclosure, may take the form of a computer program product embodied in any tangible medium of expression having computer-usable program code embodied in the medium. Additionally, controller 80 and controller 380, as embodied by the disclosure, may take the form of a non-transitory computer readable storage medium storing code representative of a component according to embodiments of the disclosure.

Figure 7:
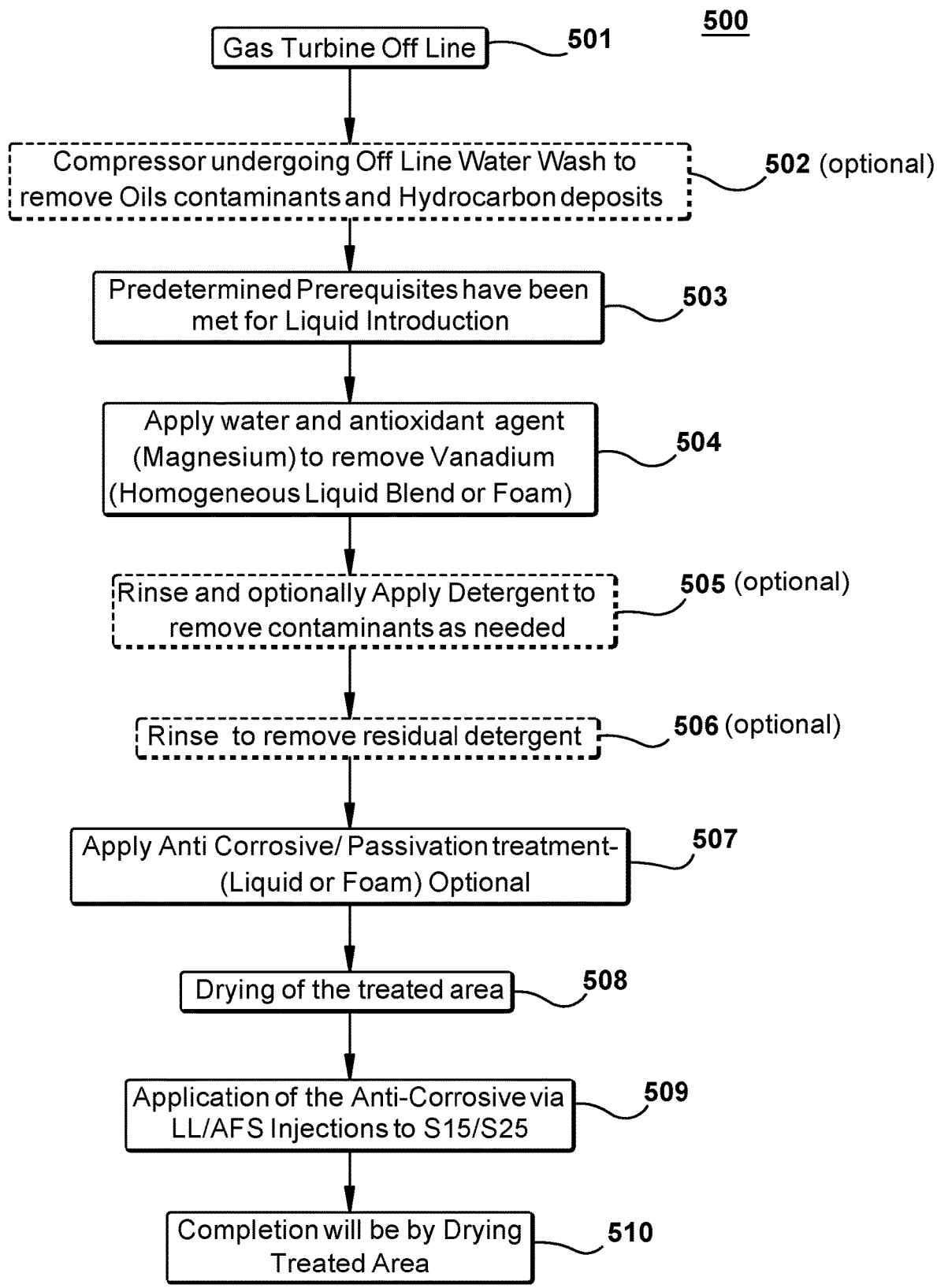
FIGS. 7, 8, and 9 are flowcharts (flow diagrams) of wash methodology as may be carried out with the wash system for a gas turbine engine system, according to embodiments of the disclosure.
Figure 8:
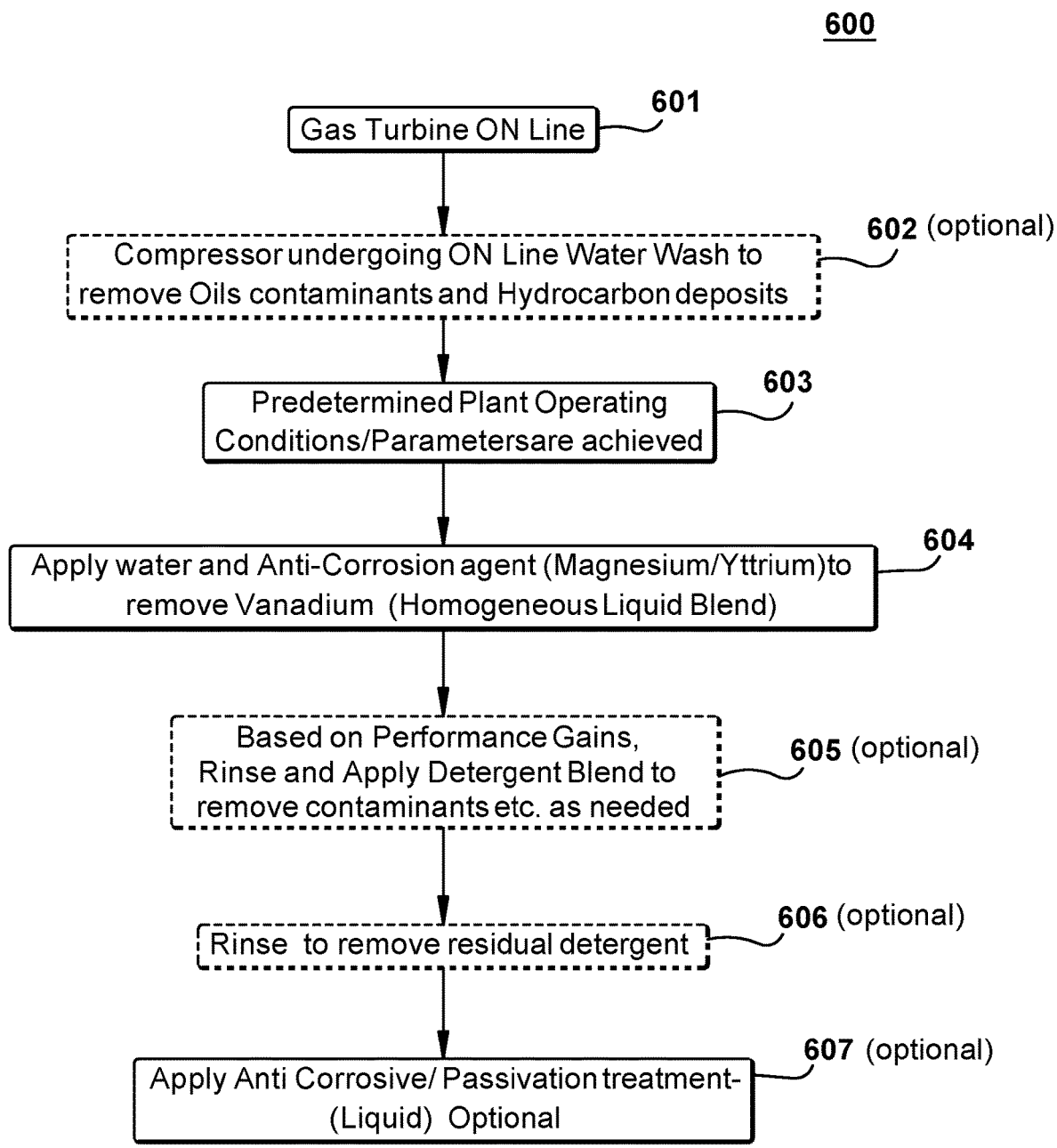
Figure 9:
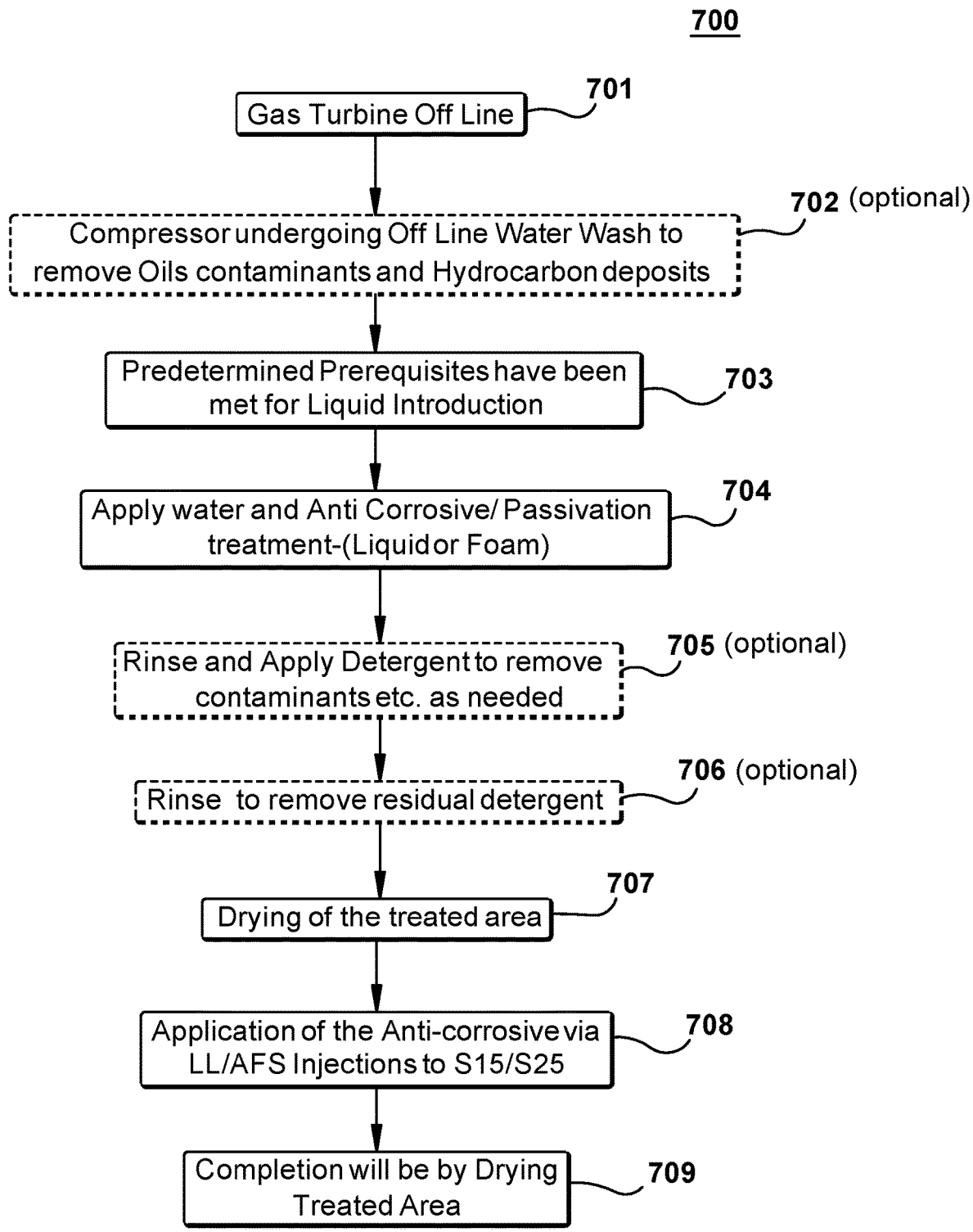

FIGS. 7-9 are flow diagrams or flow charts for processes, as embodied by the disclosure. Like steps in each flow chart are represented by like reference step numbers.

With respect to FIG. 7, the wash process 500 is an off-line process 500. In step 501, gas turbine engine system 10 is off-line. Optional process 502 is to wash compressor 15, where the compressor wash can be accomplished through known systems, either separate from wash system 100 as embodied by the disclosure, or in conjunction with wash system 100, as embodied by the disclosure. In off-line process 500, water and the particular cleansing agent are applied to internal components of gas turbine 40 through late lean injectors 60 of combustor 25. In process 500, water and an anti-oxidation agent are applied at step 503 and are applied to internal components of gas turbine 40 through late lean injectors 60 of combustor 25.

Process 504 is optional and can apply a rinse and apply detergent to remove contaminants, such as but not limited to slag, ash, oils, and the like, as needed, and can be applied to internal components of gas turbine 40 through late lean injectors 60 of combustor 25. Process 505 is also optional and can apply a rinse, if needed, are applied to internal components of gas turbine 40 through late lean injectors 60 of combustor 25. In process 500, another optional process 506 can apply a passivation treatment (similar to that applied in process 700 described hereinafter), to internal components of gas turbine 40 through late lean injectors 60 of combustor 25. Drying at process 507 of gas turbine engine system 10 components can occur for one embodiment of process 500.

As shown in FIG. 8, process 600 is an on-line wash process. In process 601, the gas turbine engine system 10 (FIG. 1) is on-line, and an optional step of washing compressor 15 may occur in process 602. In process 603, water and anti-corrosion agent(s) can be applied to internal components of gas turbine 40 through LLI(s) 60 of combustor 25. As embodied by the disclosure, magnesium or yttrium can be included as the anti-corrosion agent to remove vanadium. Moreover, in process 603 the water and anti-corrosion agent can be applied as a homogeneous liquid blend or a foam. In process 604, a rinse and detergent can be optionally applied to remove contaminants, such as but not limited to slag, ash, oils, and the like, as needed, and can be applied to internal components of gas turbine 40 through late lean injectors 60 of combustor 25. Process 605 is an optional application of a rinse, if needed, applied to internal components of gas turbine 40 through late lean injectors 60 of combustor 25. Process 606 is also an optional application of an anti-corrosive or passivation treatment.

Referring to FIG. 9, in off-line wash process 700, water and the particular agent are applied to internal components of gas turbine 40 through late lean injectors 60 of combustor 25. In process 701, gas turbine engine system 10 is off-line. Optional process 702 is to wash compressor 15, where the compressor wash can be accomplished through known systems, either separate from wash system 100 as embodied by the disclosure, or in conjunction with wash system 100, as embodied by the disclosure. In process 700, water and an anti-corrosive/passivation treatment-agent are added at process 703 and are applied to internal components of gas turbine 40 through late lean injectors 60 of combustor 25. Process 704 is optional and can apply a rinse and apply detergent to remove contaminants, such as but not limited to slag, ash, oils, and the like, as needed, and can be applied to internal components of gas turbine 40 through late lean injectors 60 of combustor 25. Process 705 is optional and can apply a rinse, if needed, applied to internal components of gas turbine 40 through LLI(s) 60 of combustor 25. Drying at process 706 of gas turbine engine system 10 components can occur for off line process 700.

Any combination of one or more computer usable or computer readable medium/media may be used for controller(s) 80 and 380. The computer-usable or computer-readable medium that may be utilized for controller(s) 80 and 380 may include, for example but not limited to, an electronic, magnetic, optical, electromagnetic, infrared, or semiconductor system, apparatus, device, or propagation medium. More specific examples (a non-exhaustive list) of the computer-readable medium that may be utilized for one or both of controllers 80 and 180 would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out wash operations, as embodied by the disclosure, may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The embodiments are described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The foregoing drawings show some of the processing associated according to several embodiments of this disclosure. In this regard, each drawing or block within a flow diagram of the drawings represents a process associated with embodiments of the method described. It should also be noted that in some alternative implementations, the acts noted in the drawings or blocks may occur out of the order noted in the figure or, for example, may in fact be executed substantially concurrently or in the reverse order, depending upon the act involved. Also, one of ordinary skill in the art will recognize that additional blocks that describe the processing may be added.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise. "Approximately," as applied to a particular value of a range, applies to both end values and, unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiment was chosen and described in order to explain the principles of the disclosure and the practical application and to enable others of ordinary skill in the art to understand the disclosure for various embodiments with various modifications as are suited to the particular use contemplated.

What is claimed is:

1. A gas turbine engine system, comprising:
a gas turbine engine, the gas turbine engine including a compressor, a combustor, and a gas turbine, the combustor including a plurality of late lean fuel injectors supplied with a secondary fuel to an interior of the combustor, the plurality of late lean fuel injectors distal to a head end of the combustor, adjacent to an upstream side of the gas turbine, and configured to supply the secondary fuel in a direction substantially transverse to a longitudinal direction of the combustor; and
a wash system configured to be attached to and in fluid communication with the plurality of late lean fuel injectors of the combustor, the wash system including:
a water source supplying water;
a first fluid source supplying a first fluid, the first fluid providing vanadium ash and vanadium deposit mitigation and removal from internal components of the gas turbine;
a mixing chamber in communication with the water source and the first fluid source;
a water pump configured to pump the water to the mixing chamber;
a first fluid pump configured to pump the first fluid to the mixing chamber;
a fluid line configured to be in fluid communication with the mixing chamber and at least one of the plurality of late lean fuel injectors such that a fluid from the mixing chamber including the water, the first fluid, or a mixture thereof is injected into the combustor at at least one of the plurality of late lean fuel injectors,
wherein the mixture is injected while the gas turbine engine is on-line.

2. The gas turbine engine system of claim 1, wherein the first fluid source includes a mixture of demineralized/deionized water and at least one of magnesium (Mg), yttrium (Y), or detergent as vanadium ash formation mitigant, the mixture of demineralized/deionized water and at least one of magnesium (Mg), yttrium (Y), or detergent as vanadium ash formation mitigant is configured to be injected into the combustor at at least one of the plurality of late lean fuel injectors; and the mixture of demineralized/deionized water and at least one of magnesium (Mg), yttrium (Y), or detergent as vanadium ash formation mitigant is delivered to the at least one of the plurality of late lean fuel injectors and then conveyed to internal components of gas turbine with a flow of combustion gases from the combustor to the gas turbine.

3. The gas turbine engine system of claim 2, wherein the mixture of demineralized/deionized water and magnesium (Mg), yttrium (Y), or detergent as vanadium ash formation mitigant is configured to remove vanadium from internal components of the gas turbine engine.

4. The gas turbine engine system of claim 2, wherein the mixture of demineralized/deionized water and magnesium (Mg), yttrium (Y), or detergent as vanadium ash formation mitigant is provided as a solution or as a foam.

5. The gas turbine engine system of claim 1, wherein the mixing chamber includes one or more angled counter flow nozzles therein, the one or more angled counter flow nozzles extending into the mixing chamber at an angle with respect to a central axis of the mixing chamber and configured to inject the first fluid at the angle in a direction counter to a flow of the water in the mixing chamber.

6. The gas turbine engine system of claim 1, wherein the water source is in communication with the mixing chamber via a water source line and the water pump.

7. The gas turbine engine system of claim 1, wherein the first fluid source is in communication with the mixing chamber via a first fluid source line and the first fluid pump.

8. The gas turbine engine system of claim 1, further including a controller, the controller being in operative communication with the water pump and the first fluid pump, wherein the controller is configured to regulate flow of the water and the first fluid through the fluid line to at least one of the plurality of late lean fuel injectors.

9. The gas turbine engine system of claim 8, wherein the controller further includes at least one flow control valve positioned in the fluid line, the at least one flow control valve in communication with the controller for enabling actuation of the at least one flow control valve between at least open and closed positions, the actuation caused by the controller.

10. The gas turbine engine system of claim 8, wherein the controller further includes at least one flow sensor positioned in the fluid line, the at least one flow sensor in communication with the controller for sensing flow in the fluid line.

11. A method of washing an on-line gas turbine engine, the gas turbine engine including a compressor, a combustor, a gas turbine, the combustor including a plurality of late lean fuel injectors distal to a head end of the combustor, adjacent to an upstream side of the gas turbine, and supplied with a secondary fuel to an interior of the combustor, the method comprising:

supplying water from a water source to a mixing chamber of a wash system;
supplying a first fluid from a first fluid source to a mixing chamber of the wash system, the first fluid providing vanadium ash and vanadium deposit mitigation and removal from internal components of the gas turbine;
supplying the water and first fluid to the mixing chamber including pumping water from the water source and pumping the first fluid from the first fluid source; and
injecting fluid from the mixing chamber to at least one of the plurality of late lean fuel injectors while the gas turbine engine is on-line, wherein each late lean fuel injector in the plurality of late lean fuel injectors are configured to inject the fluid from the mixing chamber in a direction substantially transverse to a longitudinal direction of the combustor.

12. The method of claim 11, wherein the first fluid source includes a mixture of demineralized/deionized water and at least one of magnesium (Mg), yttrium (Y), or detergent.

13. The method of claim 12, the method includes removing vanadium from internal components of the gas turbine engine by the mixture of demineralized/deionized water and magnesium (Mg), yttrium (Y), or detergent.

14. The method of claim 12, the method including providing the mixture of demineralized/deionized water and magnesium (Mg), yttrium (Y), or detergent as a solution or as a foam.

15. The method of claim 11, wherein the mixing chamber includes one or more angled counter flow nozzles therein, the one or more angled counter flow nozzles extending into the mixing chamber at an angle with respect to a central axis of the mixing chamber and to inject the first fluid at the angle in a direction counter to a flow of the water in the mixing chamber.

16. The method of claim 11, the gas turbine engine further including a controller, the controller in operative communication with the water pump, the first fluid pump, and the fluid line, wherein the method includes the controller regulating a flow of the water and the first fluid through the fluid line to at least one of the plurality of late lean fuel injectors.

17. The method of claim 11, the method further includes forming a vanadium based ash component magnesium orthovanadate [$3MgO \cdot V_2O_5$] by treating deposited vanadium at an appropriate Mg/V ratio, wherein magnesium orthovanadate does not melt and remains in a solid state on the internal components of the gas turbine.

18. The method of claim 11, the method further includes forming an additional ash component, the additional ash component includes water soluble magnesium sulfate ($MgSO_4$), wherein $MgSO_4$ can be removed through water washing.

* * * * *